(12) United States Patent
Liu

(10) Patent No.: US 12,310,899 B2
(45) Date of Patent: May 27, 2025

(54) COFFIN AND METHOD FOR COLLECTING HUMAN BONES

(71) Applicant: Wu Liu, Gaoan (CN)

(72) Inventor: Wu Liu, Gaoan (CN)

( * ) Notice: Subject to any disclaimer, the term of this patent is extended or adjusted under 35 U.S.C. 154(b) by 0 days.

(21) Appl. No.: 18/329,528

(22) Filed: Jun. 5, 2023

(65) Prior Publication Data

US 2023/0310248 A1 Oct. 5, 2023

Related U.S. Application Data

(63) Continuation of application No. PCT/CN2021/132248, filed on Nov. 23, 2021.

(30) Foreign Application Priority Data

Dec. 6, 2020 (CN) .......................... 202011413300.4

(51) Int. Cl.
*A61G 17/04* (2006.01)
*A61G 17/00* (2006.01)

(52) U.S. Cl.
CPC .......... *A61G 17/048* (2016.11); *A61G 17/042* (2016.11); *A61G 17/044* (2016.11); *A61G 17/001* (2017.05)

(58) Field of Classification Search
CPC .. A61G 17/048; A61G 17/044; A61G 17/042; A61G 17/001; A61G 17/04; A61G 17/047; A61G 17/00; A61G 17/0166; A61G 17/06; Y02W 30/30; E05B 65/0057
USPC .............................................................. 27/8
See application file for complete search history.

(56) References Cited

U.S. PATENT DOCUMENTS

| | | | | |
|---|---|---|---|---|
| 1,452,029 A | * | 4/1923 | Sanford | A61G 17/04 40/541 |
| 2,179,409 A | * | 11/1939 | Hulsart | A61G 17/04 362/154 |
| 2,516,488 A | * | 7/1950 | Smith | A61G 17/048 27/11 |
| 3,435,494 A | * | 4/1969 | Bernard | A61G 17/048 27/11 |

(Continued)

FOREIGN PATENT DOCUMENTS

| | | |
|---|---|---|
| AU | 3511401 | 10/2001 |
| CN | 2067563 U | 12/1990 |

(Continued)

*Primary Examiner* — William L Miller
(74) *Attorney, Agent, or Firm* — Hemisphere Law, PLLC; Zhigang Ma

(57) ABSTRACT

A coffin is provided, and the coffin includes a coffin body with a top opening and a coffin lid for closing the coffin body. The coffin lid is provided with an air intake hole and an exhaust air hole, the air intake hole and the exhaust air hole are respectively connected to an air intake device and an exhaust air device through pipelines to supply the oxygen required for decomposition of a body and exhaust waste gases. The coffin lid is further provided with an exhaust liquid pipe connected to a peristaltic pump. An oxygen or carbon dioxide sensor, and a hydrogen sulfide or ammonia concentration sensor are installed in an exhaust channel. The coffin body includes a plastic waterproof bag, and the coffin lid is pasted with adhesive plastic film. The function of the plastic waterproof bag is to prevent waste liquids from polluting the coffin body.

14 Claims, 12 Drawing Sheets

(56) References Cited

U.S. PATENT DOCUMENTS

| | | | | |
|---|---|---|---|---|
| 3,716,072 | A * | 2/1973 | Criswell | A61G 17/00 137/544 |
| 3,810,282 | A * | 5/1974 | Doggett | A61G 17/0166 27/35 |
| 3,945,094 | A * | 3/1976 | Daran | E04H 13/005 52/129 |
| 4,463,484 | A | 8/1984 | Valle Arizpe | |
| 4,780,940 | A * | 11/1988 | Jay | A61G 17/06 27/28 |
| 4,924,565 | A * | 5/1990 | Rathjen | A61G 17/0136 27/11 |
| H1348 | H * | 9/1994 | Linville | A61G 17/004 27/19 |
| 5,426,573 | A * | 6/1995 | Jenkins | F16B 5/0614 27/DIG. 1 |
| 5,444,900 | A * | 8/1995 | Shawhan | A61F 13/51121 27/35 |
| 5,568,677 | A * | 10/1996 | Tobin | A61G 17/036 27/14 |
| 5,659,932 | A * | 8/1997 | Wright | A61G 17/048 27/7 |
| 5,715,583 | A | 2/1998 | Sandoval | |
| 7,251,869 | B1 * | 8/2007 | Brown, Sr. | A61G 17/00 52/136 |
| 7,398,582 | B1 * | 7/2008 | VerPlank | E05B 65/0057 27/DIG. 1 |
| 8,240,013 | B2 * | 8/2012 | Williamson | A61G 17/0136 27/14 |
| 8,695,184 | B1 * | 4/2014 | Mikat | A61G 17/048 27/11 |
| 8,931,147 | B2 * | 1/2015 | Sullivan | B09B 3/0075 241/301 |
| 9,216,128 | B2 * | 12/2015 | Richardson | A61G 17/06 |
| 9,480,617 | B1 * | 11/2016 | Cook | E04H 13/00 |
| 9,492,697 | B2 * | 11/2016 | Wilson | B09B 3/00 |
| 10,596,055 | B1 * | 3/2020 | Fernandez | A61G 17/0136 |
| 10,835,773 | B2 * | 11/2020 | Mason | B09B 5/00 |
| 11,428,406 | B1 * | 8/2022 | Mason | D21C 7/10 |
| 11,439,559 | B2 * | 9/2022 | Jenkins | A61G 17/048 |
| 11,541,369 | B1 * | 1/2023 | Mason | B09B 3/70 |
| 2005/0120526 | A1 * | 6/2005 | Nihipali | A01N 1/00 27/21.1 |
| 2009/0080811 | A1 * | 3/2009 | Stefanek | B65D 81/18 383/61.3 |
| 2010/0146750 | A1 * | 6/2010 | Dannenberg | A61G 17/04 27/1 |
| 2010/0186207 | A1 * | 7/2010 | Moore | A61G 17/036 27/1 |
| 2010/0213292 | A1 * | 8/2010 | Sullivan | A61G 17/0136 27/3 |
| 2014/0013554 | A1 * | 1/2014 | Hojaji | C08K 11/00 27/1 |
| 2014/0359983 | A1 * | 12/2014 | Beliveau | A61G 17/036 27/11 |
| 2020/0022862 | A1 * | 1/2020 | Jenkins | A61G 17/00 |
| 2020/0207675 | A1 * | 7/2020 | Bernstein | B09B 5/00 |
| 2022/0015975 | A1 * | 1/2022 | Hasnaoui | A61G 17/047 |
| 2025/0082534 | A1 * | 3/2025 | Minajew | A61G 17/0136 |

FOREIGN PATENT DOCUMENTS

| | | |
|---|---|---|
| CN | 2137147 | 6/1993 |
| CN | 205234874 | 5/2016 |
| CN | 105942817 | 9/2016 |
| CN | 108969284 | 12/2018 |
| CN | 110483109 | 11/2019 |
| DE | 292786 | 6/1916 |
| DE | 29921202 | 2/2000 |
| DE | 19853940 | 5/2000 |
| TW | 514523 | 12/2002 |
| WO | 9613240 | 5/1996 |
| WO | 0076448 A2 | 12/2000 |
| WO | 2016020169 | 2/2016 |
| WO | 2020089713 | 5/2020 |

* cited by examiner

COFFIN AND METHOD FOR COLLECTING HUMAN BONES

TECHNICAL FIELD

The disclosure relates to a coffin, and particularly to a coffin used to decompose a body into bones (i.e., remains of the dead), and collect the bones or cremate the bones into bone ashes. The disclosure is a supplement to cremation.

BACKGROUND

At present, there are two main types of funerals: burial in the ground and cremation. The burial occupies a large area of land, while the cremation occupies less land, but some people feel afraid and difficult to accept cremation after death.

SUMMARY

In view of the above, the disclosure provides a coffin, the oxygen-containing air can be supplemented into the coffin through an exhaust air pipe and an air intake pipe, so as to accelerate the decomposition of a body into bones, and then collect the bones or cremate the bones into bone ashes. An air intake pump and an exhaust air pump can be started or stopped by the Internet of Things measuring concentration changes of specific gases in the coffin. The progress of the decomposition can be determined by analyzing a rate of concentration changes of the specific gases in the coffin at a constant temperature. If necessary, an endoscope can be used before opening the coffin to confirm that the decomposition of the body has been completed. After the decomposition of the body is completed, the body in the coffin can be sterilized, disinfected, cleaned and dried without opening the coffin lid. The waste gases and waste liquids can be treated centrally and the impact on the environment can be reduced.

Preferably, the coffin is provided with one of a vent hole, a vent groove, a vent gap, and an opening covered by a breathable membrane; the one of the vent hole, the vent groove, the vent gap, and the opening covered by the breathable membrane is configured to supply oxygen required for decomposition of the body in the coffin, thereby to shorten time required for the decomposition of the body. The coffin is one of a rigid coffin only accommodating a body, a body bag whose material is a soft material, a coffin that includes a plurality of compartments configured to accommodate a plurality of bodies, and a coffin that simulates a bedroom environment.

Preferably, gases in the coffin is exhausted forcibly through the one of the vent hole, the vent groove, the vent gap, and the opening covered by the breathable membrane.

Preferably, oxygen-containing gases are input forcibly through the one of the vent hole, the vent groove, the vent gap, and the opening covered by the breathable membrane.

Preferably, the coffin is made of at least one of rust-proof and corrosion-proof materials, and the rust-proof and corrosion-proof materials include but are not limited to stainless steel, aluminum, copper, plastic, pottery, porcelain, stone, concrete, glass, enamel, other metals with rust prevention treatment on surfaces, and wood with corrosion prevention treatment.

Preferably, the coffin is provided with a waterproof bag, the waterproof bag is configured to isolate the body to prevent decomposed liquids from polluting the coffin and polluting environment, and reduce a leakage of waste gases.

The waterproof bag is made of one of materials including but being not limited to polyethylene, high-density polyethylene, polypropylene, polyvinyl chloride, polyethylene terephthalate, rubber, aluminum foil, aluminum foil paper, tin foil paper, aluminum foil cloth, and wax paper.

Preferably, the coffin is provided with an exhaust liquid pipe configured to exhaust excessive waste liquids generated during the decomposition of the body, and the exhaust liquid pipe is further configured to transmit water rich in bacterium into the coffin to cause the decomposition of the body when the decomposition of the body is not ongoing.

Preferably, a humidity sensor is installed in the coffin to detect the humidity in the coffin, and the humidity sensor is preferably but not limited to be installed in an exhaust gas channel (also referred to as a channel).

Preferably, the coffin is provided with sensors to detect concentrations of specific gases in the coffin, the specific gases include oxygen, carbon dioxide, ammonia, and hydrogen sulfide. An air intake pump and an exhaust air pump are controlled to be started or stopped according to changes of the concentrations of the specific gases and the humidity in the coffin; and the sensors are preferred but not limited to be disposed in the exhaust gas channel.

Preferably, the coffin includes a coffin lid and a coffin body that matches the coffin lid; the connection between the coffin lid and the coffin body is locked with a lock, and only family members can open the lock on site to ensure that bones of deceased relatives of the family members will not be confused with those of others; and the lock includes but is not limited to one of a mechanical lock capable of being opened with a key, a password lock, a fingerprint lock, a magnetic card lock, and an integrated circuit (IC) card lock.

Preferably, a partial or total area of one of a coffin lid and a coffin body is made of a transparent or semi-transparent material; when a customer chooses a coffin before death, the light-permeable coffin can reduce the customer's fear to a confined space of an ordinary opaque coffin; and a transparent area of the coffin is capable of being designed as a window for playing videos to provide a lively atmosphere.

Preferably, one of a specific object and a design is used to prevent ants or maggots from entering and exiting the coffin through intake and exhaust channels, and the specific object and design include but are not limited to one-way valves, screens, porous breathable objects, multi-fiber breathable objects, breathable membranes, narrow gaps, and fine pores.

Preferably, an inner height of the coffin that simulates the bedroom environment is greater than an average height of adults.

Preferably, there is a bed or a platform in the coffin that simulates the bed environment, and the body is placed on the bed or platform and decomposed into the bones.

Preferably, some areas of a top or an inner wall of the coffin that simulates the bedroom environment are light-permeable, and the coffin that simulates the bedroom environment can be well lighted in daytime.

Preferably, an inside of the coffin that simulates the bedroom environment is provided with lights for illumination.

The disclosure further provides a method for collecting the bones using the coffin, including: supplying the coffin with oxygen required for decomposition of a body to shorten time required for the decomposition of the body.

Preferably, the supplying the coffin with oxygen required for the decomposition of the body includes: using one of a water electrolysis reaction and a chemical reaction to generate the oxygen to supply the oxygen required for the decomposition of the body in the coffin, thereby to shorten the time required for the decomposition of the body.

Preferably, the supplying the coffin with oxygen required for the decomposition of the body includes: placing an oxygen cylinder in the coffin to release the oxygen to supply the oxygen required for the decomposition of the body, thereby to shorten the time required for the decomposition of the body.

Preferably, the method includes: inhaling or blowing air outside the coffin into a gap communicated with the inside of the coffin, thereby to supply external oxygen into the coffin.

Preferably, the method includes: alternately compressing and expanding a volume of gases in the coffin to cause alternate changes in gas pressure in the coffin, thereby to make gases inside and outside the coffin to flow out and flow in the coffin through a gap.

Preferably, the method for collecting the bones includes: alternately performing an operation selected from heating and reducing pressure and an operation selected from cooling or increasing pressure on chemicals that undergo reversible chemical reactions with specific gases in the coffin, the reversible chemical reactions making the specific gases in the coffin to be alternately released and absorbed, thereby to cause alternate changes in gas pressure in the coffin and make gases inside and outside the coffin to flow out and flow in the coffin through a gap; and the reversible chemical reactions including but being not limited to a reaction of carbon dioxide dissolving in water and a reaction of ammonia dissolving in water.

Preferably, the method includes: placing a gas compression pump in the coffin, alternately compressing and storing gases into a container in the coffin and releasing the compressed gas from the container, thereby to make gases outside and inside the coffin flow in and flow out the coffin through a gap.

The disclosure further provides a coffin configured to decompose a body into bones, and collect the bones or cremate the bones into bone ashes. the coffin is provided with a waterproof bag, the waterproof bag is configured to isolate the body to prevent decomposed liquids from polluting the coffin and polluting environment, and reduce a leakage of waste gas; the waterproof bag is made of one of materials including but being not limited to polyethylene, high-density polyethylene, polypropylene, polyvinyl chloride, polyethylene terephthalate, rubber, aluminum foil, aluminum foil paper, tin foil paper, aluminum foil cloth, and wax paper.

The disclosure further provides a paper coffin configured to decompose a body into bones, and collect the bones or cremate the bones into bone ashes.

Preferably, the paper coffin is made of a paper material being treated by infiltration treatment using an oily liquid, during decomposition of the body, the paper coffin does not absorb water, deform and collapse; and the oily liquid includes but is not limited to paint and melted wax, and a typical type of the paint is a Tung oil.

Preferably, the coffin is composed of a coffin body, a plastic waterproof bag, a coffin lid, and screws configured to fix the coffin lid on the coffin body. Handles are provided on two sides of the coffin body for easy handling of the coffin. A frame is provided at a bottom of the coffin body to increase strength and prevent deformation. The inner wall of the coffin lid is covered with an adhesive plastic film. An air intake hole, an exhaust air hole, and an exhaust liquid hole are provided on the coffin lid. A fourth hole (also referred to as a closed hole) that is usually sealed and provided on a middle of the coffin lid. After the decomposition of the body is completed, through the fourth hole, the exhaust air hole, and the air intake hole, disinfectant is added into coffin, the bones are cleaned and blown dry. A humidity sensor, and at least one of oxygen, carbon dioxide, hydrogen sulfide and ammonia concentration sensors are placed in an exhaust air channel of the coffin.

Preferably, an exhaust liquid pipe extends into the coffin through the exhaust liquid hole on the coffin lid, a part of the exhaust liquid pipe is pressed between the body and the plastic waterproof bag, and the end of the exhaust liquid pipe is pre-blocked to prevent inhalation of large foreign objects. Multiple small liquid intake holes with a diameter of less than 1 millimeter are distributed on the part of the exhaust liquid pipe that is pressed under the body, so that the exhaust liquid pipe will not be impossible to discharge liquid from the coffin due to blockage of one hole. A peristaltic pump or a vacuum pump is connected to the exhaust liquid pipe to extract waste liquids from the coffin.

Preferably, the air intake hole on the coffin lid is connected to an air intake pipe, the air intake pipe is connected to a one-way valve and a sealed container (such as a large plastic water bottle) containing water below. An air intake pump sends external air into the water bottom of the sealed container, so that moist air is sent into the coffin.

Preferably, the exhaust air hole on the coffin lid is connected to the exhaust air pipe, the one-way valve, and the exhaust air pump, and gases in the coffin is discharged outward. The one-way valve can prevent small animals from entering the exhaust air pipe. Concentration sensors for specific gases can be placed in the exhaust air channel to measure the concentrations of specific gases in the coffin, and the air intake pump and exhaust air pump can be started and stopped according to the changes in the concentrations of specific gases. Temperature and humidity sensors can be placed in the exhaust air channel. The exhaust capacity of the exhaust air pump should be greater than that of the air intake pump to ensure that the gas pressure in the coffin does not exceed the external atmospheric pressure, so that waste gases in the coffin will not leak to the surrounding environment.

Preferably, after the decomposition of the body is completed, disinfectant is added through the three large holes in the middle of the coffin lid and the exhaust liquid pipe to sterilize and disinfect the inside of the coffin, then clean water is added into the coffin and the bones are cleaned with ultrasonic cleaning rods, circulating water is used to remove the dirts from the coffin, and compressed air is used to blow and dry the bones and clothing. Finally, it's time to open the coffin lid and collect the bones.

Preferably, the coffin lid will be locked on the coffin body. The families of the deceased do not have to worry about mixing up bones with those of others.

Preferably, materials of the coffin body and coffin lid are generally stainless steel plates or formed by injection molding to facilitate reuse.

Preferably, outer surfaces of the stainless steel plates of the coffin can also be painted with colors, printed or laser engraved with numbers and patterns, or pasted with stickers with numbers, deceased identification information, and graphics for purposes of identification and decoration.

Preferably, partial areas of the coffin lid can be covered with transparent glass that facilitates viewing the progress of decomposition or designed as a window for a video device that provides a lively atmosphere to the coffin.

Except for the coffin described above. Preferably, a high-grade extra-large coffin that simulates a bed room environment is provided, which can accommodate a bed, and can be well lighted (such as frosted glass in some areas of the coffin). The inner height of the coffin is larger than a height of an adult. The body will be placed on the bed and decomposed into bones. The coffin that simulates the bedroom environment can also have lights that turn on regularly at night, and can be equipped with a TV and air conditioner.

DESCRIPTION OF REFERENCE NUMERALS

Figure 1:
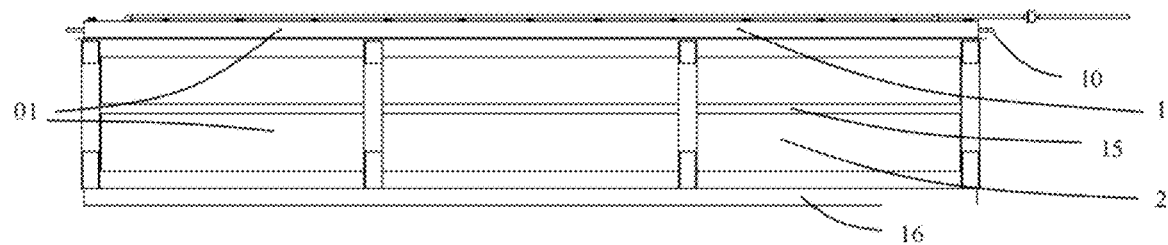
FIG. 1 illustrates a side view of a coffin used to accelerate decomposition of a body into bones and then collect the bones or cremate the bones into bone ashes according to an embodiment of the disclosure.

01—coffin; 1—coffin lid; 2—coffin body; 3—peristaltic pump; 4—exhaust liquid pipe; 5-exhaust air pipe; 6—one-way valve; 7—air intake pipe; 8—closed hole; 9—screw; 10—coffin lid handle; 11—adhesive plastic film; 12—waterproof bag; 13—sealing strip; 14—body; 15—coffin body handle; 16—frame; 17—exhaust air hole; 18—air intake hole; 19—air intake pump; 20—rubber stopper; 21—narrow-necked bottle; 22—water; 23—breathable stone; 24—three-way joint; 25—exhaust air pump; 26—oxygen or carbon dioxide concentration sensor; 27—hydrogen sulfide or ammonia concentration sensor; 28—channel; 29—small hole; 30—lock; 31—lock catch; 32—breathable net; 33—vent groove; 34—shielding cover; 35—body bag; 36—rigid rod; 37—fixed ring; 38—blowing-air pipe; 39—bell mouth; 40—fan; 41—air bag or liquid bag; 42—coffin lid cover; 43—elastic airbag; 44—compartment; 45—door.

DETAILED DESCRIPTION OF EMBODIMENTS

The following is a detailed description of the specific embodiments of the disclosure in conjunction with attached drawings, which will make the technical solutions and beneficial effects of the disclosure more obvious.

As shown in FIG. 1 to FIG. 4, a coffin 01, configured to decompose a body 14 into bones, and collect the bones or cremate the bones into bone ashes. The coffin 01 includes a coffin body 2 with a top opening and a coffin lid 1 configured to close the top opening of the coffin body 2. A plastic waterproof bag 12 is disposed in the coffin body 2 to prevent waste liquids generated during the decomposition of a body 14 from polluting the coffin body 2 and the external environment, which is conducive to the reuse of coffin 01. Screws 9 are configured to fix coffin lid 1 to coffin body 2 and press a top edge of the plastic waterproof bag 12 between an adhesive plastic film 11 on the bottom surface of coffin body 2 and coffin lid 1, making it is difficult for gases in the coffin 01 to leak out. As needed, a sealing strip 13 can also be disposed between the adhesive plastic film 11 on a bottom surface of the coffin lid 1 and the top edge of the plastic waterproof bag 12, making it more difficult for the gases in the coffin 01 to leak out.

In an embodiment, the coffin 01 includes a body bag 35 made of a soft material.

In an embodiment, the coffin 01 includes multiple compartments 44 configured to accommodate multiple bodies 14.

In an embodiment, the coffin 01 includes a high-grade coffin that simulates a bedroom environment. But the coffin 01 does not include a traditional wooden coffin that is buried in the soil for several years and then excavated to collect bones.

The coffin 01 is intentionally designed with one of a vent hole, a vent groove 33, a vent gap, and an opening covered by a breathable membrane; the one of the vent hole, the vent groove 33, the vent gap, and the opening covered by the breathable membrane is configured to supply oxygen required for the decomposition of the body 14 in the coffin 01 forcibly, thereby to shorten time required for the decomposition of the body 14. On the one hand, the one of the vent hole, the vent groove 33, the vent gap, and the opening covered by the breathable membrane is configured to exhaust gases in the coffin 01 forcibly. On the other hand, the one of the vent hole, the vent groove, the vent gap, and the opening covered by the breathable membrane is further configured to intake oxygen-containing gases forcibly. In order to make the coffin 01 reusable, the coffin 01 is made of at least one of rust-proof and corrosion-proof materials, and the rust-proof and corrosion-proof materials include but are not limited to stainless steel, aluminum, copper, plastic, pottery, porcelain, stone, concrete, glass, enamel, other metals with rust prevention treatment on surfaces, and wood with corrosion prevention treatment.

The coffin lid 1 mainly includes stainless steel plates and stainless steel square tubes assembled with screws. The bottom of coffin lid 1 is covered with the adhesive plastic film 11 to prevent the gases generated during the decomposition of the body 14 from corroding the coffin lid 1. The coffin body 2 includes stainless steel plates, stainless steel angle steels, stainless steel square tubes, stainless steel rectangular tubes, and stainless steel circular tubes assembled with screws. The bottom of coffin body 2 is provided a frame 16 to prevent deformation of the bottom of the coffin body 2, and there are coffin body handles 15 on both sides of coffin body 2 to facilitate the carry of the coffin 01. The coffin 01 is provided with a waterproof bag 12, the waterproof bag 12 is configured to isolate the body 14 to prevent decomposed liquids from polluting the coffin 01 and polluting environment, and reduce a leakage of waste gases; the waterproof bag 12 is made of one of materials including but not limited to polyethylene, high-density polyethylene, polypropylene, polyvinyl chloride, polyethylene terephthalate, rubber, aluminum foil, aluminum foil paper, tin foil paper, aluminum foil cloth, and wax paper. The coffin 01 is provided with an exhaust liquid pipe 4 configured to exhaust excessive waste liquids generated during the decomposition of the body 14, and the exhaust liquid pipe 4 is further configured to transmit water rich in bacterium into the coffin 01 to cause the decomposition of the body when the decomposition of the body is not ongoing.

The coffin lid 1 is provided with an air intake hole 18, an exhaust air hole 17, and an exhaust liquid hole. The air intake hole 18 and the exhaust air hole 17 are respectively connected to an air intake pipe 7 and an exhaust air pipe 5. A part of the exhaust liquid pipe 4 extends into an internal bottom of the coffin body 2 through the exhaust liquid hole, and usually a part of the exhaust liquid pipe 4 is pressed under the body 14. There is also a closed hole 8 in the middle of coffin lid 1, which is closed before completing the decomposition of the body 14. After the decomposition of the body 14 is completed, bones in the coffin 01 are disinfected and cleaned, and blown dry with compressed air through the exhaust liquid pipe 4, the closed hole 8 after being opened, the exhaust air hole 17, and the air intake hole 18. There are also two retractable coffin lid handles 10 provided on the coffin lid 1, allowing workers to move the coffin lid 1 by the coffin lid handles 10. The air intake pipe 7 and the exhaust air pipe 5 are respectively connected with one-way valves 6 to prevent small animals from entering and exiting the coffin 01 through the air intake pipe 7 or the exhaust air pipe 5.

Figure 4:
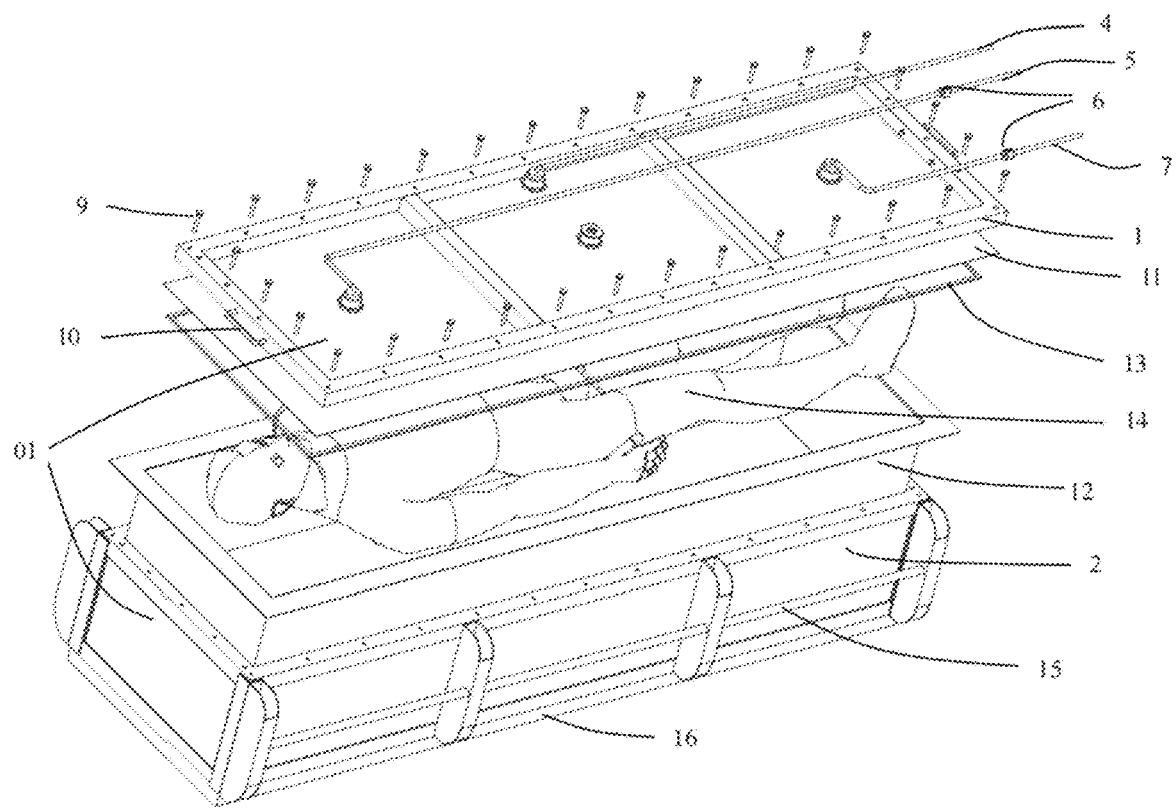
FIG. 4 illustrates an exploded view of the coffin used to accelerate decomposition of a body into bones and then collect the bones or cremate the bones into bone ashes according to the embodiment of the disclosure.
Figure 5:
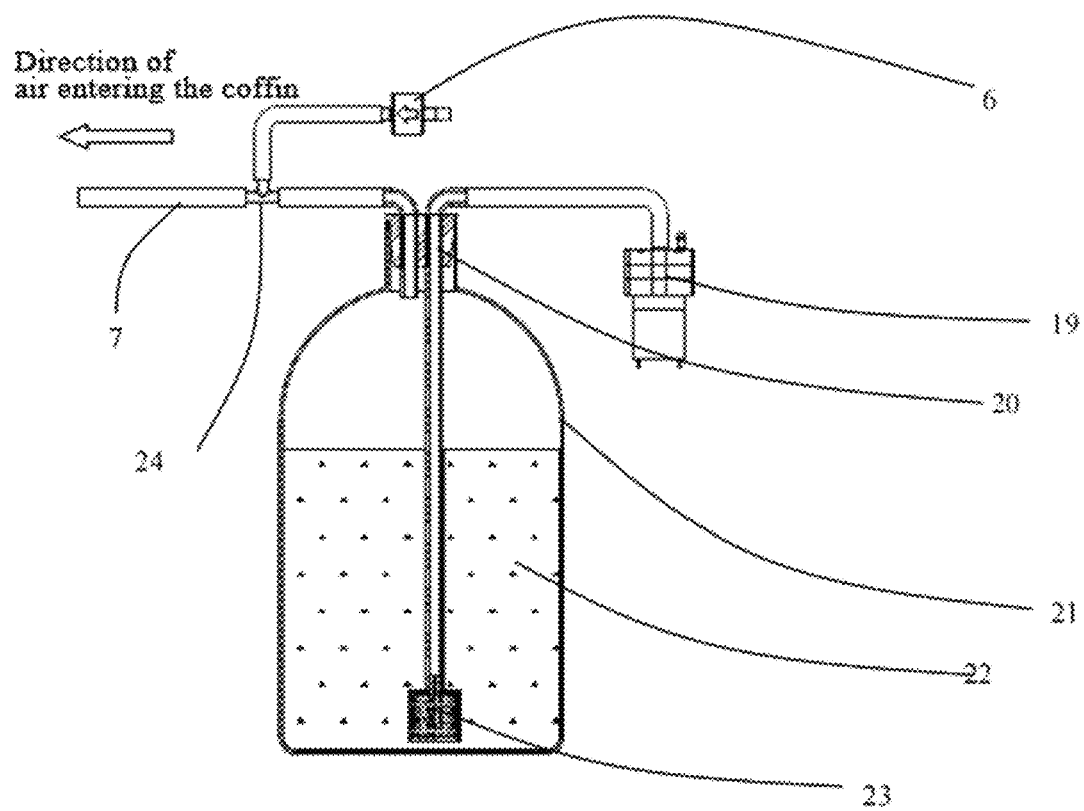
FIG. 5 illustrates a schematic view of an air intake device of the coffin used to accelerate decomposition of a body into bones and then collect the bones or cremate the bones into bone ashes according to an embodiment of the disclosure.

As shown in FIG. 4 and FIG. 5, an end of the air intake pipe 7 in FIG. 4 far from the coffin lid 1 is connected to two short pipes through a three-way joint 24 in FIG. 5. One of the short pipes in FIG. 5 is provided with the one-way valve 6 which is unidirectionally connected towards the air intake pipe 7. An end of the other short pipe extends into a narrow-necked bottle 21 through a rubber stopper 20, the neck of the narrow-necked bottle 21 is provided with the rubber stopper 20, the rubber stopper 20 is penetrated with a long pipe, an end of the long pipe in the narrow-necked bottle 21 is provided with a breathable stone 23, and another end of the long pipe outside the narrow-necked bottle 21 is connected to an air intake pump 19 (such as an oxygenation pump for aquarium). The air intake pump 19 transmits the external air into water 22 in the narrow-necked bottle 21 through the permeable stone 23. Since the narrow-necked bottle 21 is sealed by the rubber stopper 20, so that moist air can only be transmitted into the coffin 01 through the air intake pipe 7. The role of the one-way valve 6 in FIG. 5 is to make the exhaust air pump 25 in FIG. 6 can also intake the external air into the coffin 01 through the one-way valve 6 in FIG. 5 while the air intake pump 19 do not work.

Figure 6:
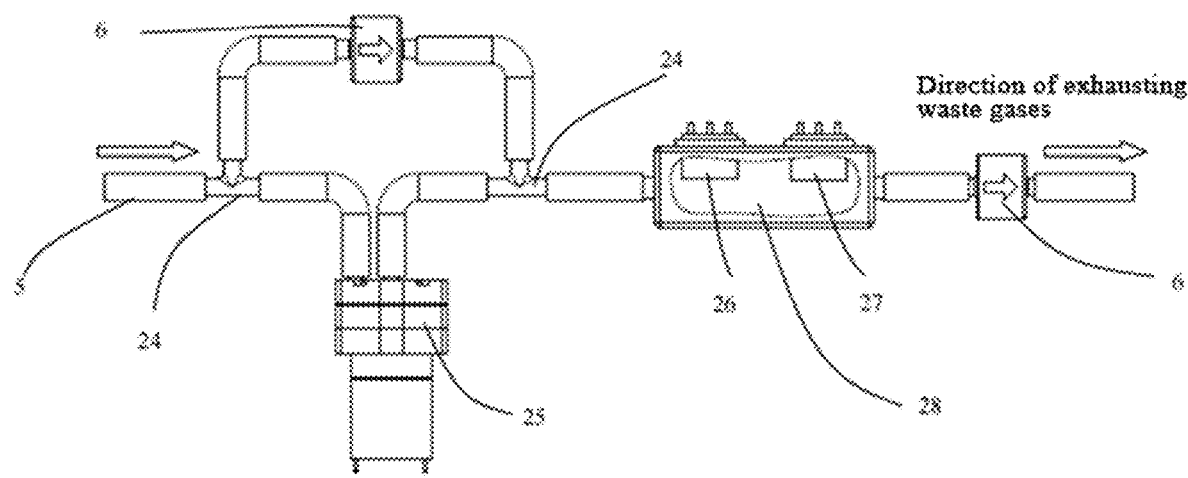
FIG. 6 illustrates a schematic view of an exhaust air device of the coffin used to accelerate decomposition of a body into bones and then collect the bones or cremate the bones into bone ashes according to an embodiment of the disclosure.

As shown in FIG. 4 and FIG. 6, an end of the exhaust air pipe 5 in FIG. 4 far away from the coffin lid 1 is connected to an intake pipe of the exhaust air pump 25 through the three-way joint 24 in FIG. 6. An exhaust pipe of the exhaust pump air 25 is connected to a channel 28 (also referred to as an exhaust gas channel 28) through a pipeline, an oxygen or carbon dioxide concentration sensor 26 and a hydrogen sulfide or ammonia concentration sensor 27 are disposed in the channel 28. Then, waste gases in the coffin 01 are exhausted through the one-way valve 6 to a centralized treatment system of waste gases. Of course, temperature and humidity sensors can also be placed in the channel 28. The exhaust pipe of exhaust air pump 25 is connected to the pipeline through the three-way joint 24. The one-way valve 6 is disposed between the three-way joint 24 on the right side of exhaust air pipe 5 and the three-way joint 24 on the right side of the exhaust pipe of the exhaust air pump 25. The one-way valve 6 is unidirectionally connected in a direction from the exhaust air pipe 5 to the exhaust pipe of the exhaust air pump 25. The function of the one-way valve 6 between the two three-way joints 24 in FIG. 6 is to make the waste gases in the coffin 01 can be exhausted only by the air intake pump 19 in FIG. 5 through the one-way valve 6 between the two three-way joints 24 in FIG. 6 while the exhaust air pump 25 does not work.

A humidity sensor can be installed in the coffin 01 to detect the humidity in the coffin 01, and the humidity sensor is preferably installed in the channel 28.

The coffin 01 is provided with sensors to detect concentrations of specific gases in the coffin 01, the specific gases include oxygen, carbon dioxide, ammonia, and hydrogen sulfide; the air intake pump 19 and the exhaust air pump 25 are started or stopped according to changes of the concentrations of the specific gases; and the sensors can also be installed in the coffin 01 or any channel used to transmit the gases in the coffin 01.

Figure 2:
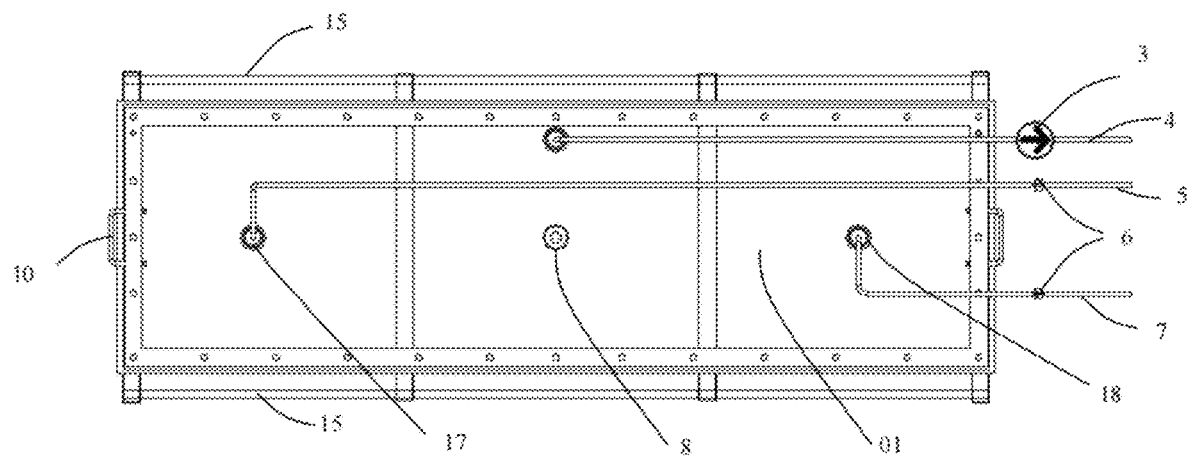
FIG. 2 illustrates a top view of the coffin used to accelerate decomposition of a body into bones and then collect the bones or cremate the bones into bone ashes according to the embodiment of the disclosure.
Figure 3:
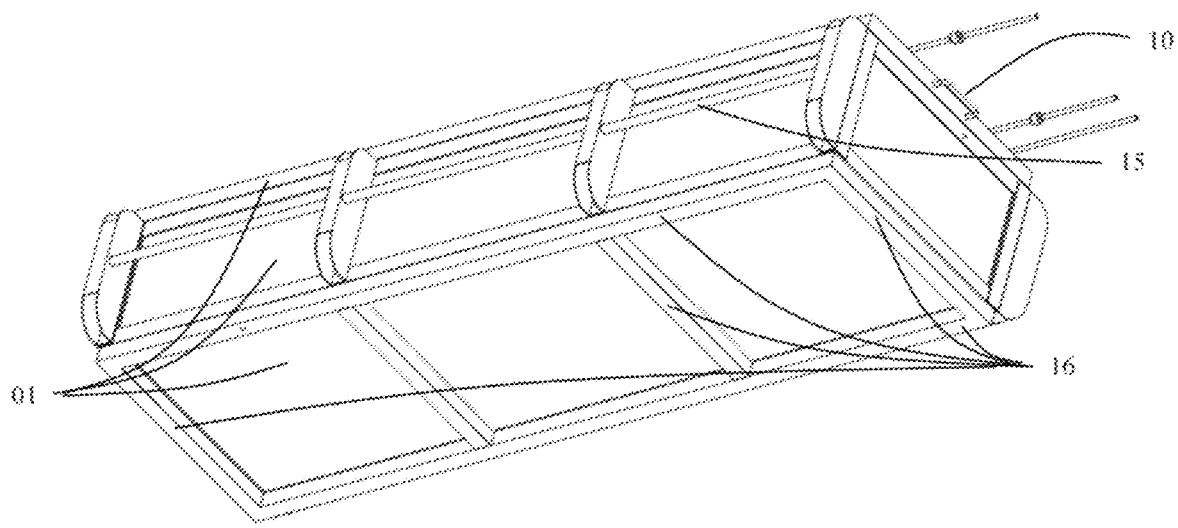
FIG. 3 illustrates a bottom view of the coffin used to accelerate decomposition of a body into bones and then collect the bones or cremate the bones into bone ashes according to the embodiment of the disclosure.
Figure 7:
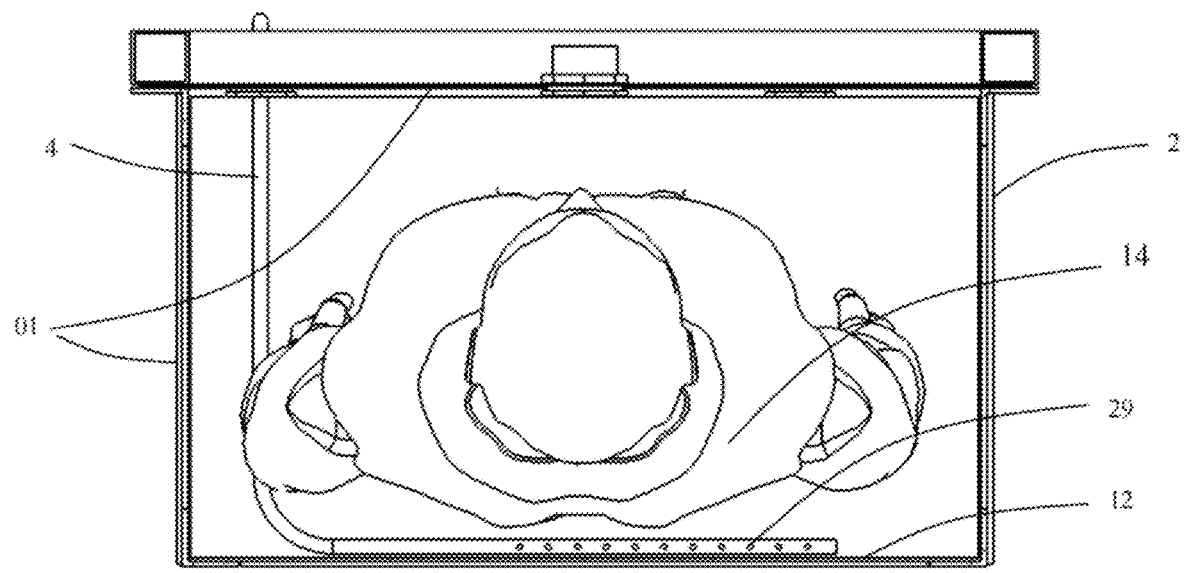
FIG. 7 illustrates a schematic view of an exhaust liquid pipe of the coffin used to accelerate decomposition of a body into bones and then collect the bones or cremate the bones into bone ashes according to an embodiment of the disclosure.

As shown in FIG. 2 and FIG. 7, the exhaust liquid pipe 4 is generally connected to a peristaltic pump 3. After the peristaltic pump 3 works, the peristaltic pump 3 can extract the waste liquids generated during the decomposition of the body 14 from the plastic waterproof bag 12. The end of the exhaust liquid pipe 4 in the coffin 01 is pre-blocked to prevent the pipeline from being blocked due to the inhalation of large foreign objects. A part of the exhaust liquid pipe 4 is pressed between the plastic waterproof bag 12 disposed at the internal bottom of the coffin body 2 and the body 14. Multiple small holes 29 are opened on a side wall of a part of the exhaust liquid pipe 4 that is pressed by the body 14, so that even if some of the small holes 29 are blocked, it will not affect the function of exhausting liquids. The part of the exhaust liquid pipe 4 that is pressed by the body 14 is further configured to transmit oxygen-containing air into the coffin 01 for accelerating the decomposition of the body 14.

Figure 8:
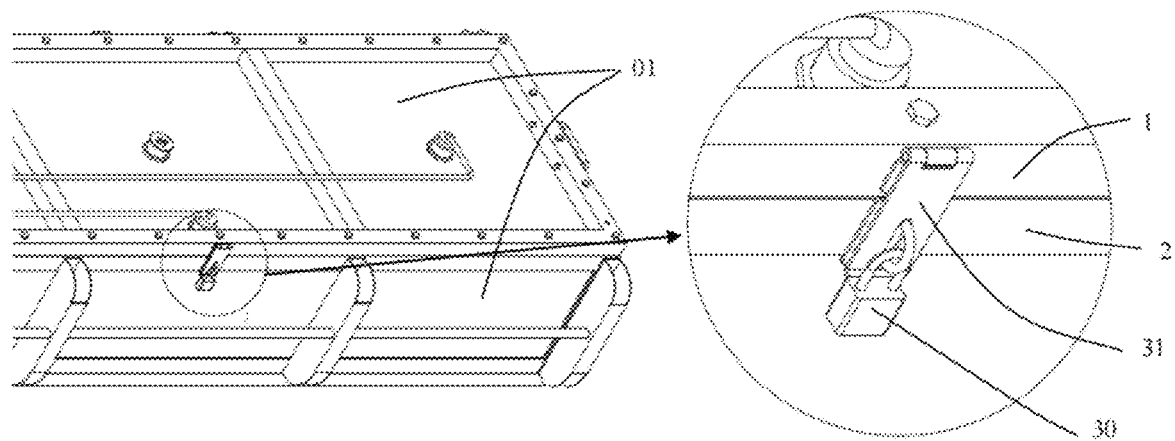
FIG. 8 illustrates a schematic view of a lock of the coffin used to accelerate decomposition of a body into bones and then collect the bones or cremate the bones into bone ashes according to an embodiment of the disclosure.

As shown in FIG. 8, both sides of the coffin body 2 and the coffin lid 1 are locked with lock catches 31 and locks 30, and keys for the locks 30 are held by the family members of the body 14. Only family members can open the locks 30 on site to ensure that bones of deceased relatives of the family members will not be confused with those of others. The lock 30 includes but is not limited to one of mechanical locks capable of being opened with keys, password locks, fingerprint locks, magnetic card locks, and IC card locks.

Figure 9:
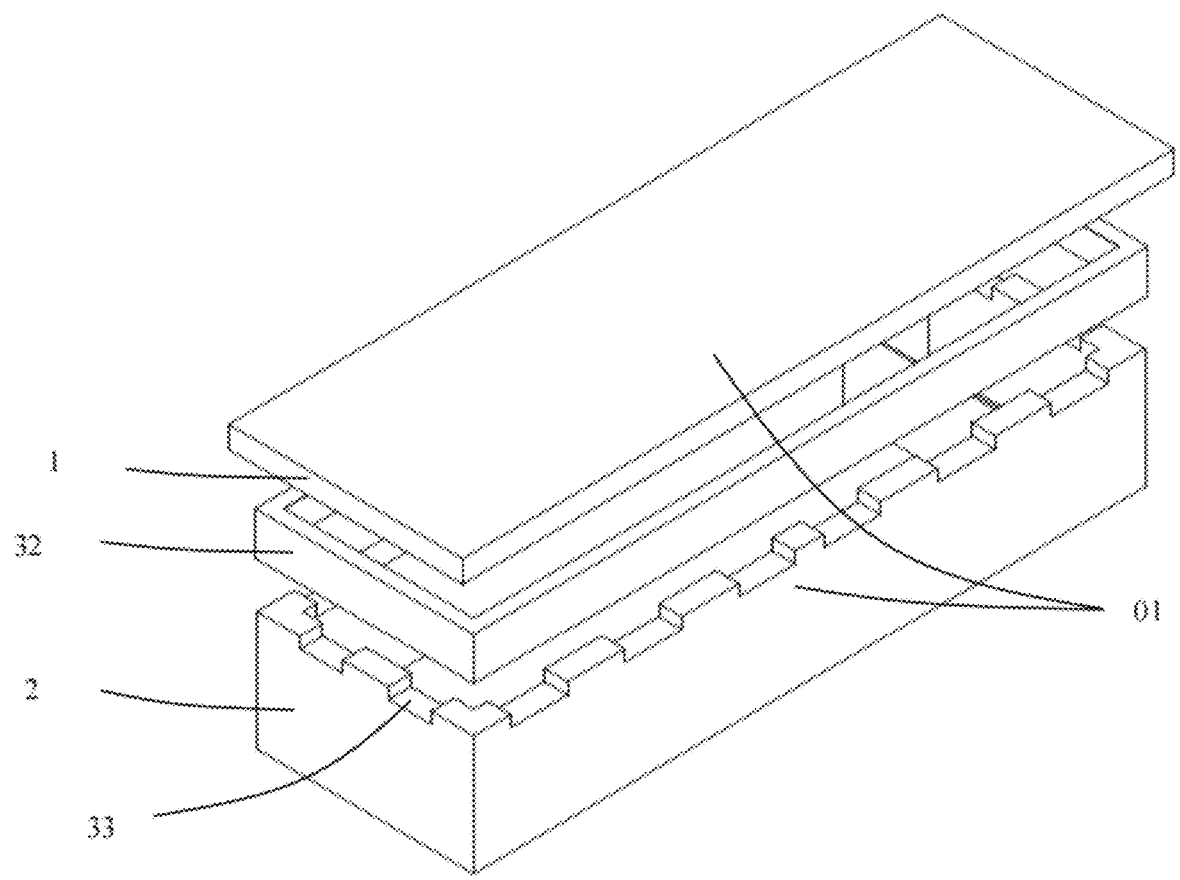
FIG. 9 illustrates a schematic exploded view of a scheme for supplying oxygen into a coffin while a net is used to prevent animals from entering and exiting vent grooves provided on a coffin body.

FIG. 9 illustrates a schematic exploded view of a scheme for supplying oxygen required for the decomposition of the body 14 into the coffin 01. Vent grooves 33 are provided on the coffin body 2, the vent grooves 33 are covered by a breathable net 32, and the breathable net 32 is configured to prevent animals from entering and exiting the vent grooves 33.

Figure 10:
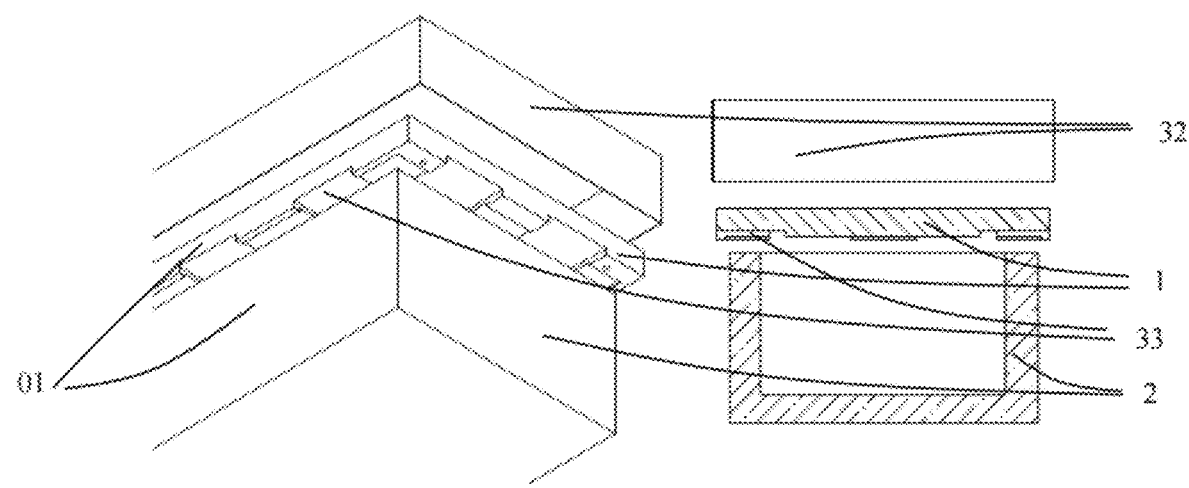
FIG. 10 illustrates a schematic structural view of a scheme for supplying oxygen into a coffin while a net is used to prevent animals from entering and exiting vent grooves provided on a coffin lid.

FIG. 10 illustrates a schematic structural view of a scheme for supplying oxygen required for the decomposition of the body 14 into the coffin 01. Vent grooves 33 are provided on the coffin lid 1, after the coffin body 2 is covered by the coffin lid 1, the vent grooves 33 are covered with a breathable net 32, and the breathable net 32 is configured to prevents animals from entering and exiting the vent grooves 33.

Figure 11:
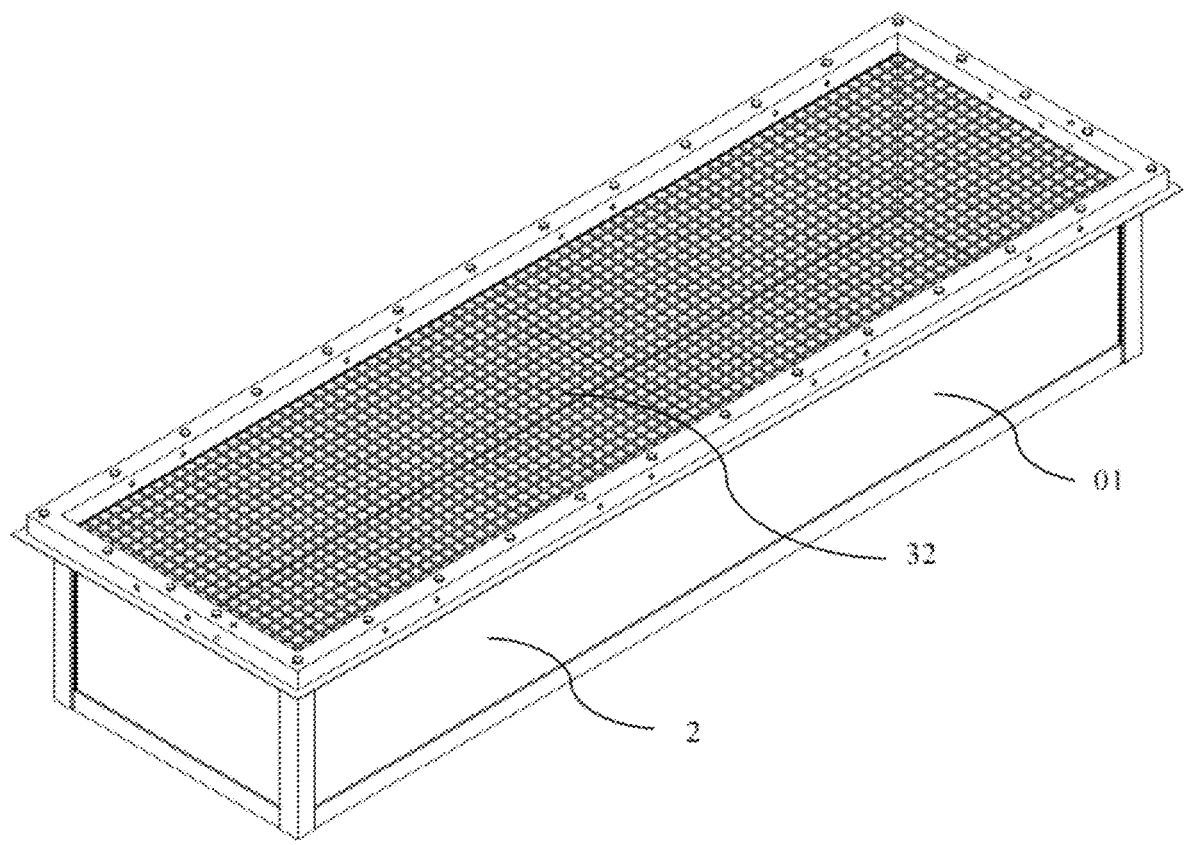
FIG. 11 illustrate a schematic view of a scheme for supplying oxygen into the coffin through a breathable net preventing animals from entering the coffin.
Figure 12:
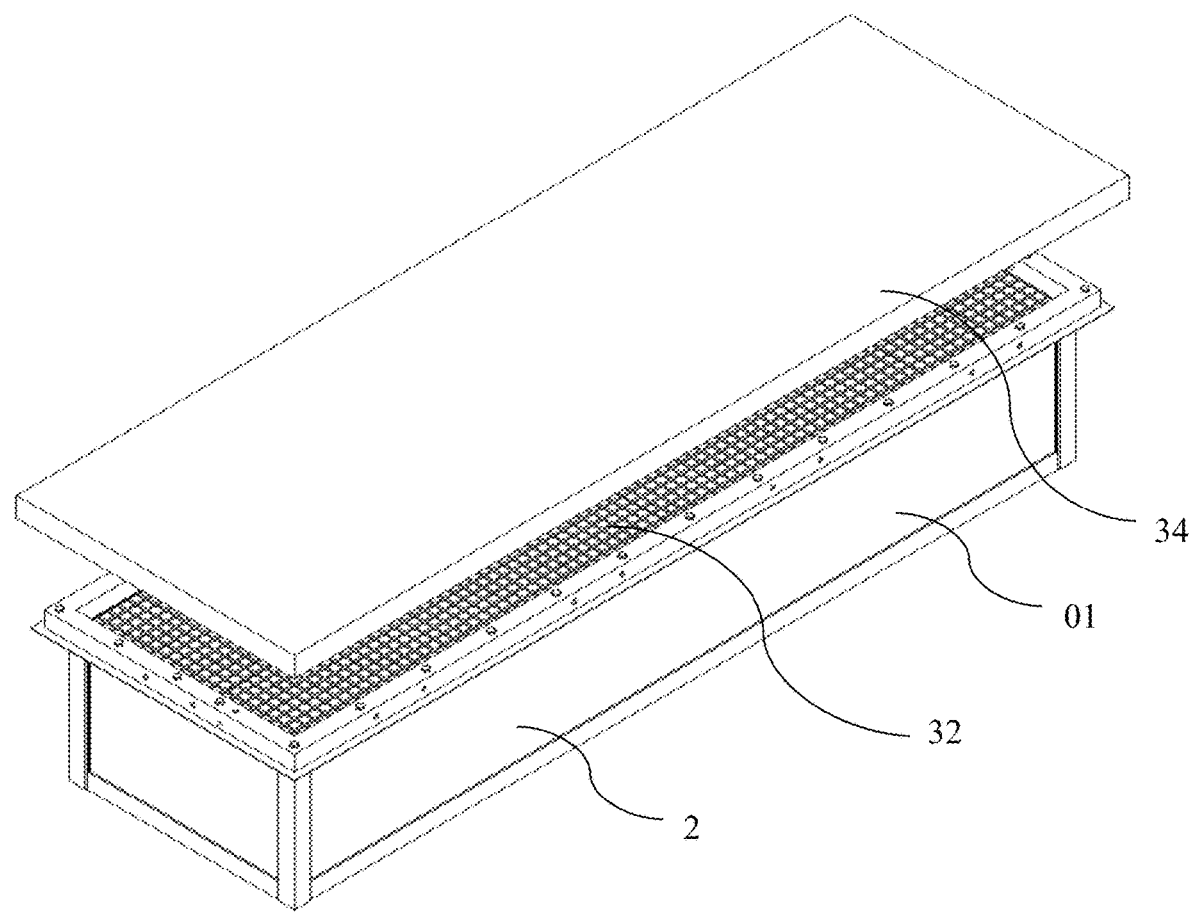
FIG. 12 illustrate a schematic view of a scheme for supplying oxygen into the coffin through a breathable net preventing animals from entering the coffin with a shielding cover.

FIG. 11 illustrates a schematic view of another scheme for supplying oxygen required for the decomposition of the body 14 into the coffin 01. The opening of coffin body 2 is directly covered with a breathable net 33, that means a coffin lid of the coffin 01 can be replaced by the breathable net 33. (the material of the breathable net here is usually a waterproof and breathable membrane) The breathable net 33 is configured to prevents animals from entering and exiting the coffin body 2. As shown in FIG. 12, a shielding cover 34 is added to prevent rainwater or debris from falling on the breathable net 33.

Figure 13:
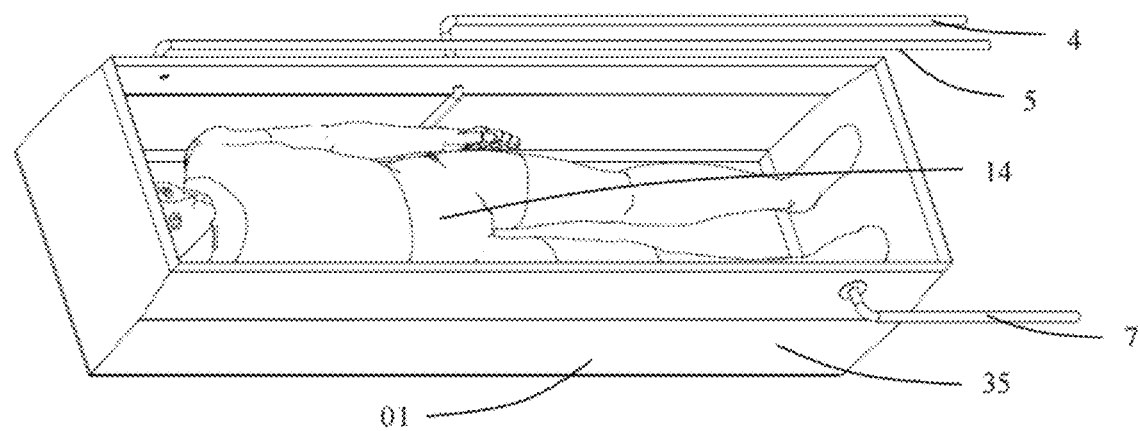
FIG. 13 illustrate a schematic view of a body bag with an air intake pipe, an exhaust air pipe, and an exhaust liquid pipe while the body bag is opened.
Figure 14:
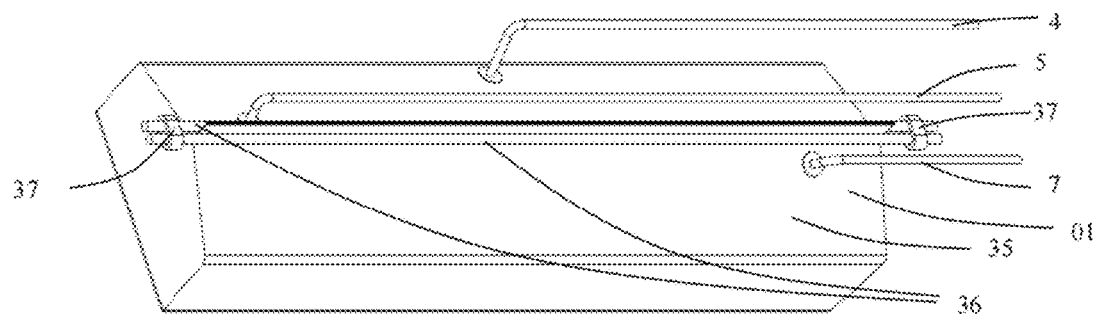
FIG. 14 illustrate a schematic view of the body bag with the air intake pipe, the exhaust air pipe, and the exhaust liquid pipe while the body bag is closed.

FIG. 13 and FIG. 14 show a body bag 35 configured for decomposing a body 14 into bones and collecting the bones. The body bag 35 is provided with an exhaust air pipe 5, an air intake pipe 7, and an exhaust liquid pipe 4. After the body 14 is placed into the body bag 35, the opening of the body bag 35 is clamped with two rigid rods 36 and two fixing rings 37 to prevent gases leakage. The air intake pipe 7 is connected to the air intake device shown in FIG. 5, and the air intake pipe 7 is configured to supply oxygen-containing air into the coffin 01. The exhaust air pipe 5 is connected to the exhaust air device shown in FIG. 6, and the waste gases generated by the decomposition of the body 14 will be exhausted into a waste gas treatment system. The exhaust liquid pipe 4 is connected to a peristaltic pump 3 to exhaust the waste liquids generated during the decomposition of the body 14. After the decomposition of the body 14 is completed, the disinfectant is transmitted into the body bag 35 for disinfection through the exhaust liquid pipe 4. Then, without opening the body bag 35, the bones are cleaned with flowing water through the exhaust liquid pipe 4, the air intake pipe 7, and the exhaust air pipe 5, the bones are dried by blowing high-pressure air next. Finally, the body bag 35 is opened for collecting the bones, and place them in a container for the family members of the body 14. If it is necessary to cremate the bones 14 into bone ashes, the body bag 35, the bones and clothing in the body bag 35 can be directly placed in a cremation furnace without the need of disinfection and cleaning after the decomposition of the body 14, burned into ashes, placed in an ash box, and handed over to the family members of the body 14.

Figure 15:
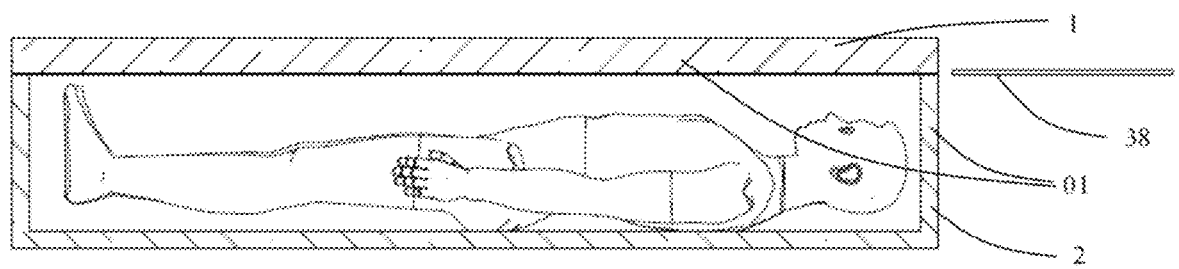
FIG. 15 illustrates a sectional view of using a pipe to blow air to a coffin gap and supply oxygen into a coffin.
Figure 16:
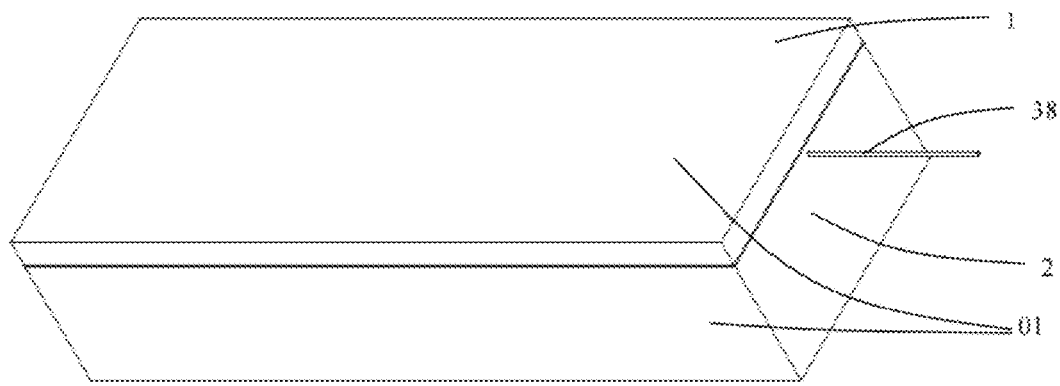
FIG. 16 illustrates a schematic view of using the pipe to blow air to the coffin gap and supply oxygen into the coffin.

FIG. 15 and FIG. 16 illustrate the use of a blowing-air tube 38 to blow air into a gap between the coffin lid 1 and the coffin body 2, thereby to supply oxygen required for the decomposition of the body 14 in the coffin 01. The gap mentioned here can also be any gap that is connected to the inside of the coffin 01.

Figure 17:
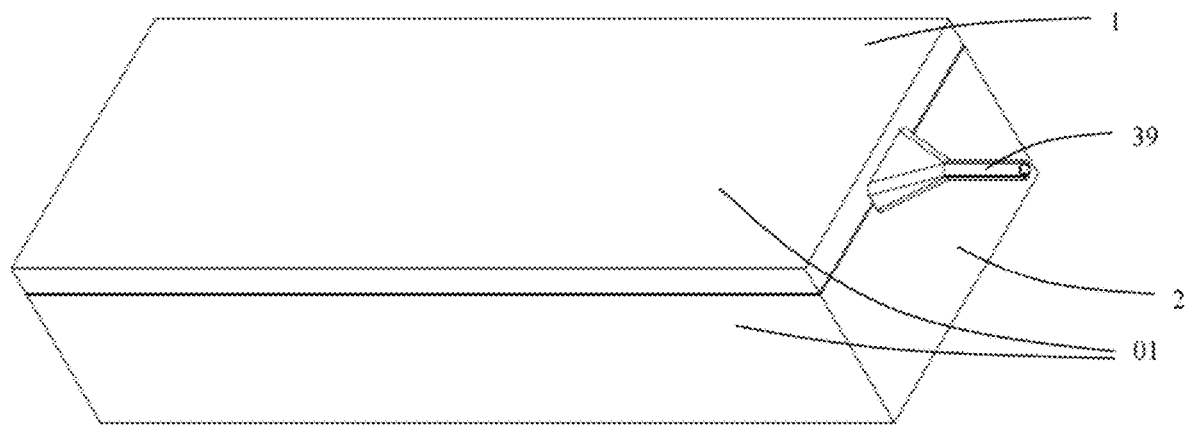
FIG. 17 illustrates a schematic view of using a bell mouth connected to the coffin gap to inhale or blow air for supplying oxygen into the coffin.

FIG. 17 illustrates the use of a bell mouth 39 to blow or inhale air to a gap between the coffin lid 1 and the coffin body 2, thereby to supply oxygen required for the decomposition of the body 14 in the coffin 01. The gap mentioned here can also be any gap that is connected to the inside of the coffin 01.

Figure 18:
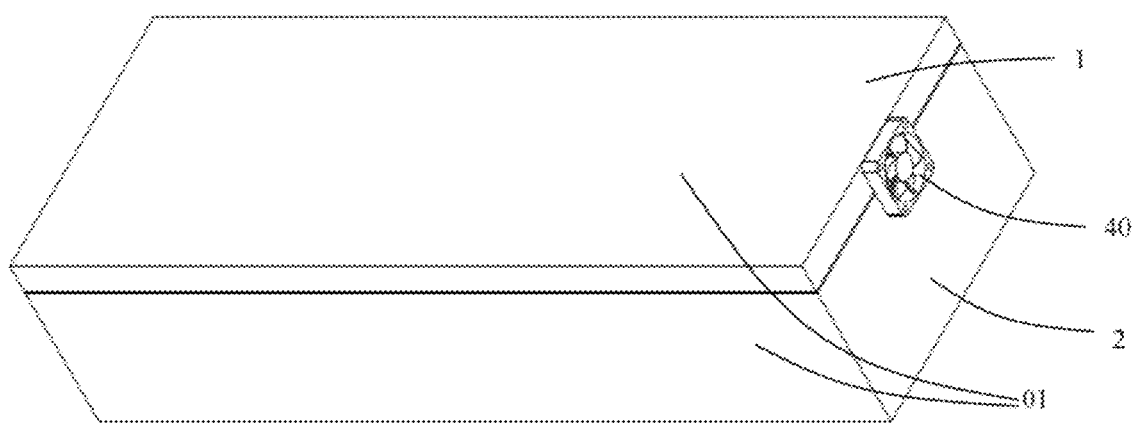
FIG. 18 illustrates a schematic view of using a fan to blow air to the coffin gap and supply oxygen into the coffin.

FIG. 18 illustrates the use of a fan 40 to blow air into a gap between the coffin lid 1 and the coffin body 2, thereby to supply oxygen required for the decomposition of the body 14 in the coffin 01. The gap mentioned here can also be any gap that is connected to the inside of the coffin 01.

Figure 19:
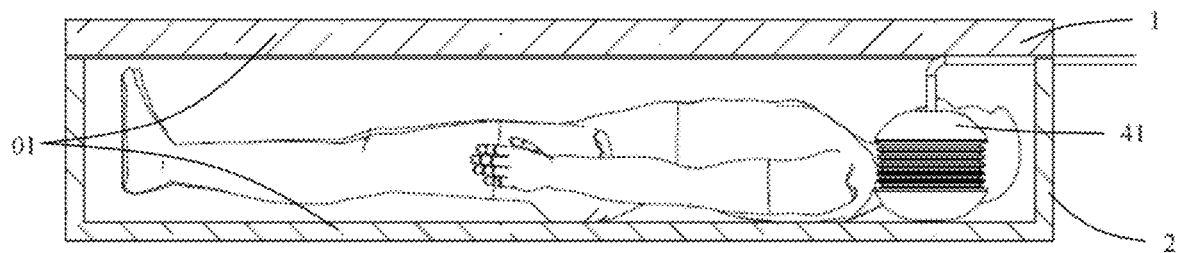
FIG. 19 illustrates a schematic view that uses the alternate contraction and expansion of an air bag or a liquid bag placed in a coffin to cause alternate changes in gas pressure in the coffin, thereby exhausting waste gases and inhaling external oxygen to supply oxygen into the coffin.
Figure 20:
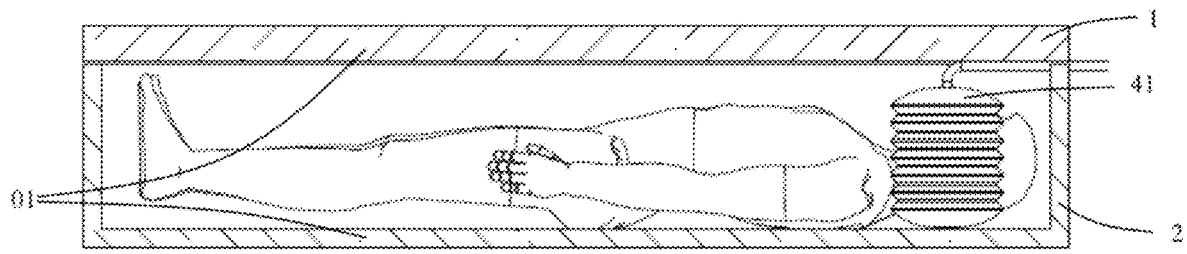
FIG. 20 illustrates another schematic view that uses alternate contraction and expansion of an air bag or a liquid bag placed in a coffin to cause alternate changes in gas pressure in the coffin, thereby exhausting waste gases and inhaling external oxygen to supply oxygen into the coffin.

FIG. 19 and FIG. 20 show the placement of a compressible and expandable air bag or liquid bag 41 in the coffin 01. By alternately compressing and expanding the volume of the air bag or liquid bag 41, gases pressure in the coffin 01 is kept lower and higher than the external air pressure. When the gas pressure in the coffin 01 is lower than the external air pressure, oxygen-containing air from the outside is inhaled into the coffin 01 through the gap. When the gas pressure in the coffin 01 is higher than the external air pressure, the waste gases in the coffin 01 is exhausted through the gap. Therefore, the oxygen required for the decomposition of the body 14 is supplied into the coffin 01.

Figure 21:
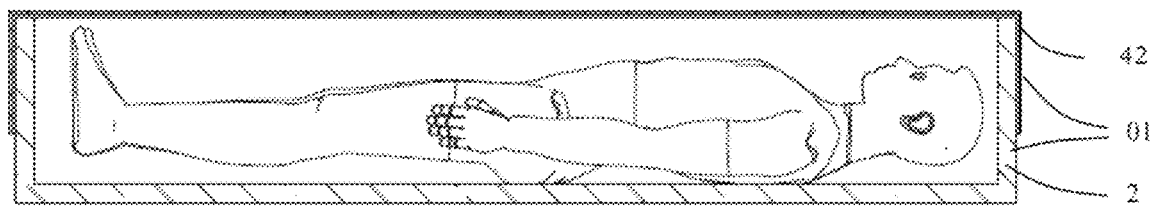
FIG. 21 illustrates a schematic view that uses alternate rise and fall of a coffin lid cover to cause alternate changes in air pressure in a coffin, thereby exhausting waste gases and inhaling external oxygen to supply oxygen into the coffin.
Figure 22:
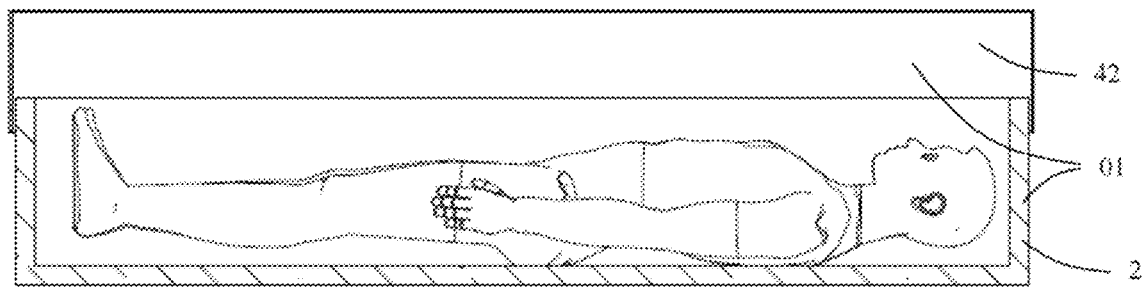
FIG. 22 illustrates another schematic view that uses alternate rise and fall of the coffin lid cover to cause alternate changes in gas pressure in the coffin, thereby exhausting waste gases and inhaling external oxygen to supply oxygen into the coffin.

FIG. 21 and FIG. 22 illustrate a liftable coffin lid cover 42. By rising and falling the coffin lid cover 42, the gas pressure in the coffin 01 decreases and increases. When the gas pressure in the coffin 01 is lower than the external air pressure, oxygen-containing air from the outside is inhaled into the coffin 01 through the gap. When the gas pressure in the coffin 01 is higher than the external air pressure, the waste gases in the coffin 01 is exhausted through the gap. Therefore, the oxygen required for the decomposition of the body 14 is supplied into the coffin 01.

Figure 23:
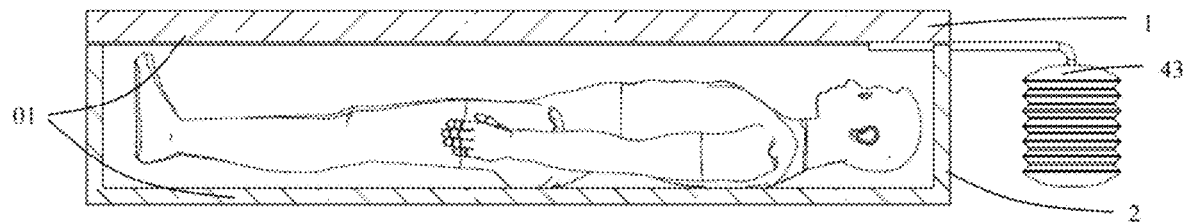
FIG. 23 illustrates a schematic view that uses alternate contraction and expansion of an elastic airbag connected to a coffin to cause alternate changes in gas pressure in the coffin, thereby exhausting waste gases and inhaling external oxygen to supply oxygen into the coffin.
Figure 24:
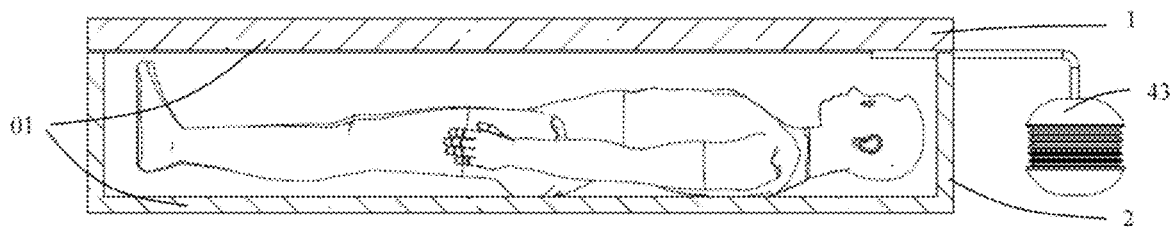
FIG. 24 illustrates another schematic view that uses alternate contraction and expansion of the elastic airbag connected to the coffin to cause alternate changes in gas pressure in the coffin, thereby exhausting waste gases and inhaling external oxygen to supply oxygen into the coffin.

FIG. 23 and FIG. 24 illustrate an elastic airbag 43 connected to gases in the coffin 01, and the elastic airbag 43 can be compressed or expanded. By expanding and compressing the elastic airbag 43, the gases pressure in the coffin 01 is kept lower and higher than the external air pressure. When the gas pressure in the coffin 01 is lower than the external air pressure, oxygen-containing air from the outside is inhaled into the coffin 01 through the gap. When the gas pressure in the coffin 01 is higher than the external air pressure, the waste gases in the coffin 01 is exhausted through the gap. Therefore, the oxygen required for the decomposition of the body 14 is supplied into the coffin 01.

Figure 25:
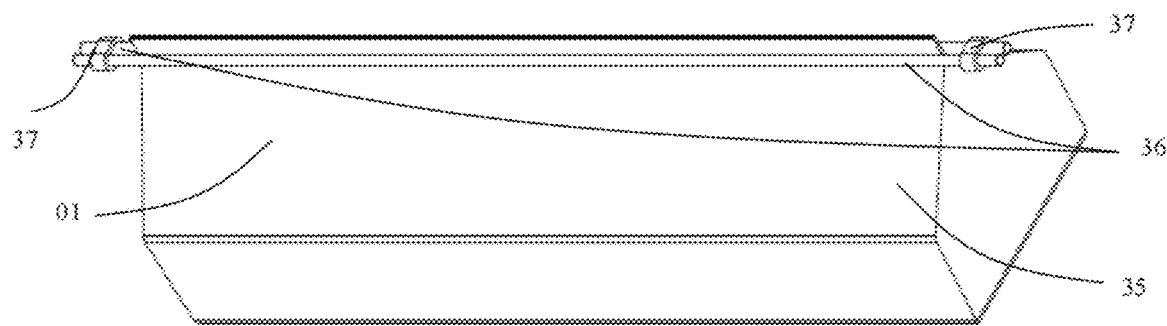
FIG. 25 illustrates a schematic view that uses of the alternate stretching and squeezing of a body bag to cause alternate changes in air pressure in the body bag, thereby exhausting waste gases and inhaling external oxygen to supply oxygen into the coffin.
Figure 26:
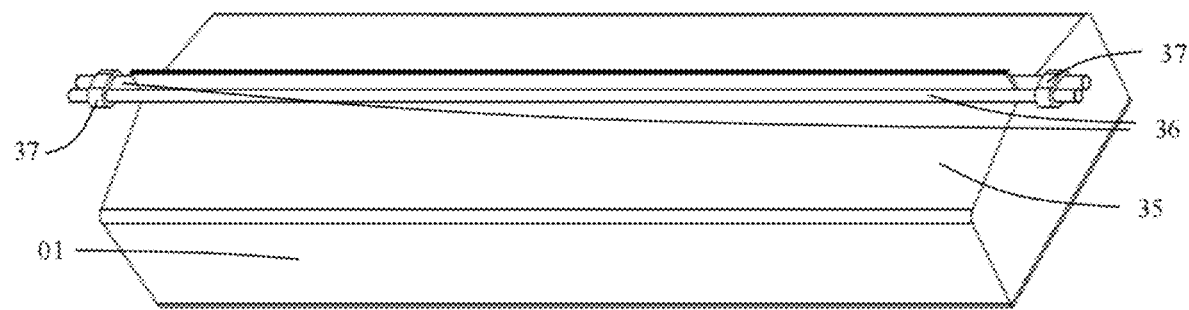
FIG. 26 illustrates another schematic view that uses of the alternate stretching and squeezing of the body bag to cause alternate changes in air pressure in the body bag, thereby exhausting waste gases and inhaling external oxygen to supply oxygen into the coffin.

FIG. 25 and FIG. 26 illustrate that by stretching and compressing the body bag 35, the gases pressure in the body bag 35 is lower and higher than the external air pressure. When the gases pressure in the body bag 35 is lower than the external air pressure, the external oxygen-containing air is inhaled into the body bag 35 through a gap. When the gases pressure in the body bag 35 is higher than the external air pressure, the waste gases in the body bag 35 is exhausted through the gap. Therefore, the oxygen required for the decomposition of the body 14 is supplied into the body bag 35.

Figure 27:
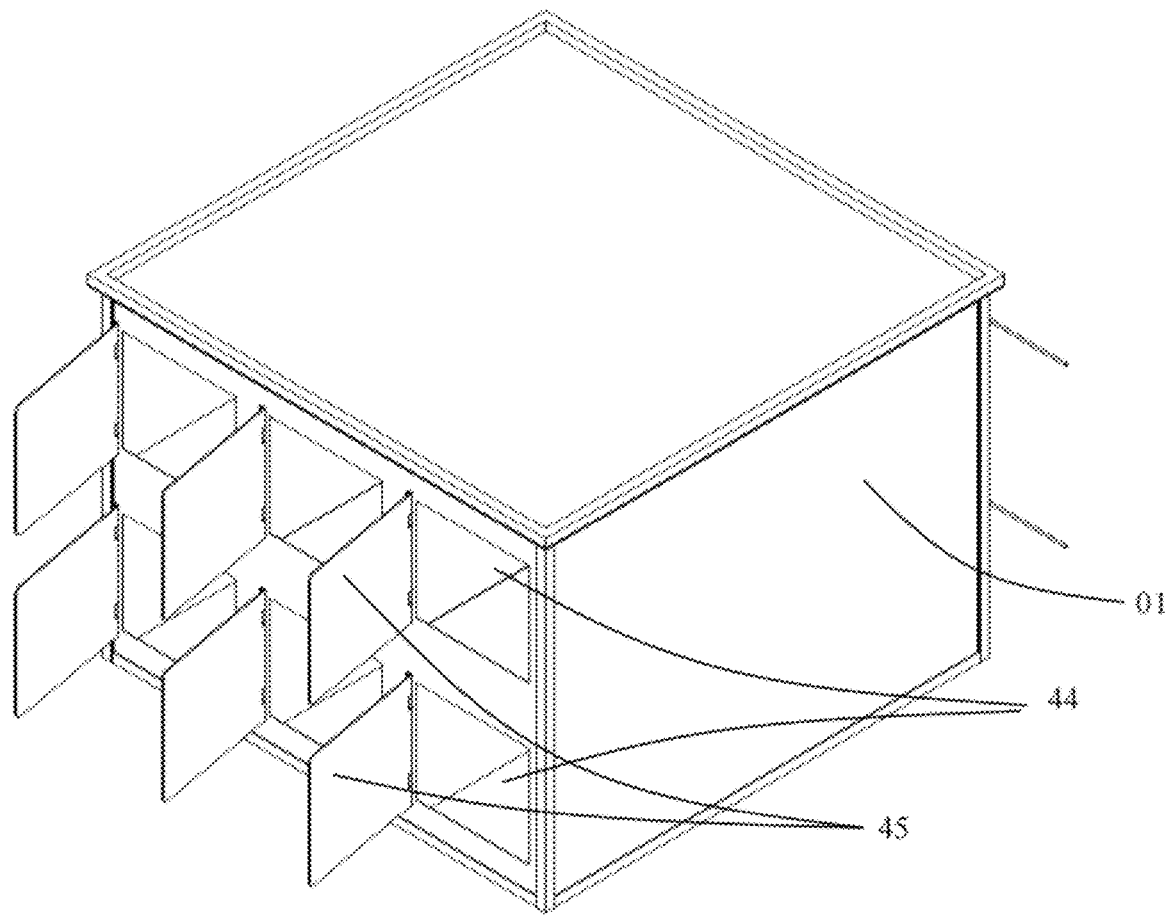
FIG. 27 illustrates a schematic view of a coffin with openings on a side that can accommodate multiple bodies for decomposition.
Figure 28:
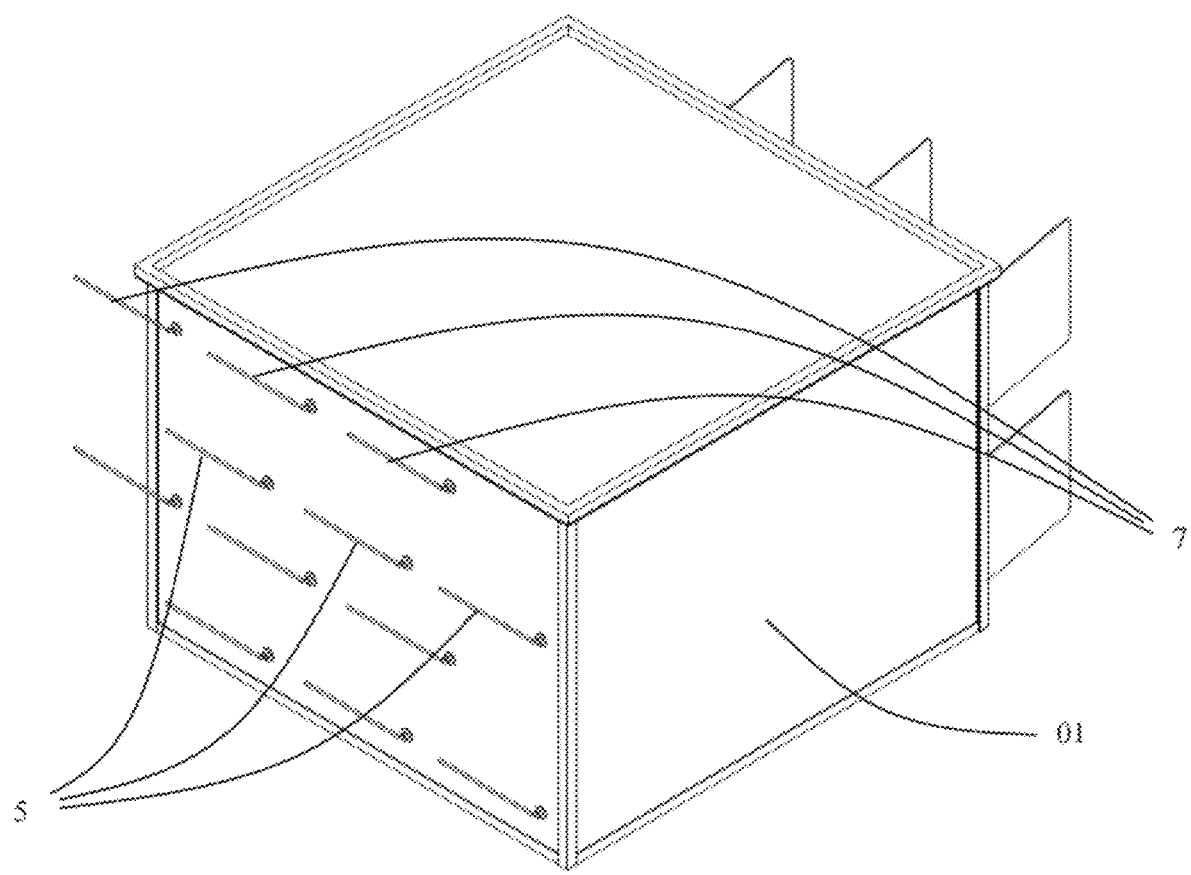
FIG. 28 illustrates another schematic view of a coffin with openings on a side that can accommodate multiple bodies for decomposition.

FIG. 27 and FIG. 28 illustrate a coffin 01 with multiple compartments 44 configured to accommodate multiple bodies 14 at the same time, the multiple compartments 44 are used for decomposing bodies into bones and collecting the bones. Each of the compartments 44 is provided with a door 45, an air intake pipe 7, and an exhaust air pipe 5. Each the air intake pipe 7 can be connected to the air intake device shown in FIG. 5, and each the air intake pipe 7 is configured to supply oxygen-containing air into a corresponding one of the compartments 44. Each the exhaust air pipe 5 is connected to the exhaust air device shown in FIG. 6, and each the exhaust air pipe 5 is configured to exhaust the waste gases generated during the decomposition of each of the multiple bodies 14 into a waste gas treatment system. After the decomposition of the body 14 is completed, disinfectant gases are transmitted into a corresponding one of compartments 44 through the air intake pipe 7 and exhaust air pipe 5 for disinfection. Then the bones in each of the compartments 44 are taken out and placed in a cremation furnace to burn them into ashes, and the ashes are placed in a cinerary casket and handed over to the family members of the body 14. Or after the bones are taken out, the bones are further cleaned, dried and put into a container for the family members of the body 14.

The following chemical reactions can supply the oxygen required for the decomposition of the body 14 in the coffin 01.

Examples of chemical reaction equations for generating oxygen:

Reaction of heating potassium chlorate (There is a small amount of manganese dioxide):

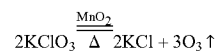

Reaction of heating potassium permanganate:

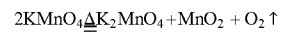

Electrolytic reaction of water:

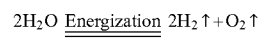

Other reactions for generating oxygen:

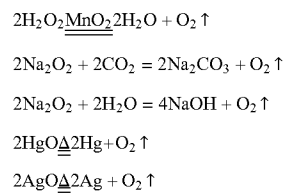

Figure 29:
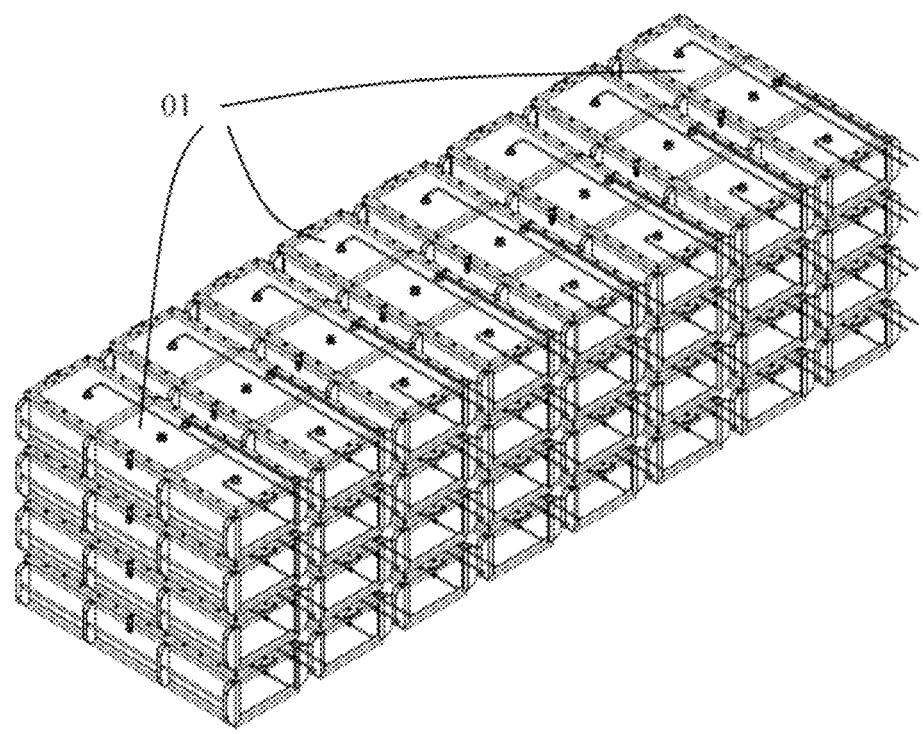
FIG. 29 illustrates a schematic view of a centralized placement of coffins for centralized control and centralized exhaust of waste liquids and waste gases.

FIG. 29 illustrates that multiple coffins are put together to facilitate centralized control of the temperature of the environment in which the coffins are placed, and facilitate centralized treatment of waste gases and waste liquids.

In an embodiment, the principle of use of the coffin 01 is described below.

The function of the exhaust air pipe 5 is to transmit the waste gases generated during the decomposition of the body 14 into a waste gas treatment system, so as not to pollute the environment.

The function of the air intake pipe 7 is to transmit oxygen into the coffin 01 to shorten the time required for the decomposition of the body 14.

The function of the waterproof bag 12 is to prevent the waste liquids generated during the decomposition of the body 14 from polluting the reusable coffin 01 and the external environment.

The function of the exhaust liquid pipe 4 is configured to extract the waste liquids from coffin 01, thereby to avoid a part of the body 14 immersed in the waste liquids not be capable of directly contacting oxygen and slow the decomposition rate of the body 14. The exhaust liquid pipe 4 is further configured to transmit oxygen-containing air under the body 14 to accelerate the decomposition rate of a bottom part of the body 14. If it is found that the decomposition of body 14 is not ongoing, water rich in bacteria can also be transmitted into the coffin 01 through the exhaust liquid pipe 4 to make the body 14 to decompose.

During the decomposition of the body 14, oxygen is consumed, carbon dioxide, hydrogen sulfide, and ammonia are generated. The function of the oxygen or carbon dioxide concentration sensor 26 and the hydrogen sulfide or ammonia concentration sensor 27 is to monitor the gas concentration in the coffin 01, as a basis for starting and stopping the air intake pump 19 and the exhaust air pump 25. In addition, it is possible to determine whether the decomposition of the body 14 is normal and whether the decomposition of the body 14 has been completed based on a rate of consuming oxygen and rates of generating carbon dioxide, hydrogen sulfide, and ammonia after stopping the transmission of oxygen into the coffin 01.

After the decomposition of the body 14 is completed, without opening the coffin lid 1, the bones in the coffin 01 can be disinfected and sterilized by adding the disinfectant through the exhaust liquid pipe 4 and the middle hole (i.e., the closed hole 8), the exhaust air hole 17, and the air intake hole 18 on the coffin lid 1. The ultrasonic cleaning rods are inserted into the water of the coffin 01 to clean the bones through the closed hole 8 after being opened, the exhaust air hole 17, and the air intake hole 18. Water inlet and outlet pipes are inserted into the coffin body 2 through the three large holes (i.e., the closed hole 8, the air intake hole 17, and the air intake hole 18) in the middle of the coffin lid 1, and circulating water is used to remove small dirts from the coffin 01, the bones and clothing are dried by blowing compressed air through the three large holes (i.e., the closed hole 8, the air intake hole 17, and the air intake hole 18) in the middle of coffin lid 1. Finally, the coffin lid 1 is opened and the bones are manually collected. The above operations can avoid the bacteria and toxic chemicals generated during the decomposition of the body 14 from affecting the health of operators, and can also reduce workload.

The disclosure includes at least one of the following beneficial technical effects:

1. In the disclosure, the function of the plastic waterproof bag 12 is to prevent the waste liquids generated during the decomposition of the body 14 from polluting the coffin body 2 and the external environment, which is beneficial for improving the reuse the coffin 01.

2. In the disclosure, the coffin lid 1 is provided with the air intake hole 18 and the exhaust air hole 17, the air inlet hole 18 is connected to the air intake device containing the air intake pump 19 through the air intake pipe 7, and the exhaust air hole 17 is connected to the exhaust air device containing the exhaust air pump 25 through the exhaust air pipe 5, thereby to supply the oxygen required during the decomposition of the body 14, shorten the time required for the decomposition of the body 14, and transmit the waste gases generated during the decomposition of the body 14 to the waste gas treatment system.

3. After the decomposition of the body 14 is completed, the closed hole 8, the air intake hole 18, and the exhaust air hole 17 in the middle of the coffin lid 1 are opened. The three holes are further configured to disinfect and clean the bones in the coffin 01, and dry the bones in the coffin 01 by blowing compressed air. There is no need to manually open the coffin lid 1, and the operations are simple and convenient.

4. In the disclosure, the air intake pipe 7 and the exhaust air pipe 5 are connected with one-way valves 6 respectively, which reduces the probability of small animals entering and exiting the coffin 01 through the intake air pipe 7 and the exhaust air pipe 5.

5. In the disclosure, a part of the exhaust liquid pipe 4 is pressed between the body 14 and the plastic waterproof bag 12 disposed at the internal bottom of the coffin 01, and multiple small holes are provided on the side wall of a part of the exhaust liquid pipe 4 pressed by the body 14. After the peristaltic pump 3 works, the waste liquids generated during the decomposition of the body 14 can be exhausted through the small holes on the exhaust liquid pipe 4. The exhaust liquid pipe 4 is further configured to transmit oxygen-containing air under the body 14 to accelerate the decomposition rate of a bottom part of the body 14. If it is found that the decomposition of body 14 is not ongoing, water rich in bacteria can also be transmitted into the coffin 01 through the exhaust liquid pipe 4 to make the body 14 to decompose.

6. In the disclosure, after the air intake pump 25 works, the air enters the narrow-necked bottle 21 containing water 22 to obtain moist air, and the moist air is transmitted into the coffin 01 through the air intake pipe 7, and the moist air accelerates the rate of the decomposition of the body. The function of the one-way valve 6 is to enable the exhaust air pump 25 alone to inhale external air into the coffin 01 through the one-way valve 6 even if the air intake pump 19 does not work.

7. In the disclosure, the waste gases extracted from the coffin 01 by the exhaust air pump 25 passes through the channel 28 containing the oxygen or carbon dioxide concentration sensor 26 and the hydrogen sulfide or ammonia concentration sensor 27, and is exhausted through the one-way valve 6 to the centralized treatment system of waste gases. Of course, temperature and humidity sensors can also be placed in the channel 28. The function of the one-way valve 6 and the two three-way joints 24 is to make the waste gases in the coffin 01 can be exhausted only by the air intake pump 19 through the one-way valve 6 between the two three-way joints 24 while the exhaust air pump 25 does not work. The concentration changes of specific gases in the coffin 01 can be measured through the oxygen or carbon dioxide concentration sensor 26 and the hydrogen sulfide or ammonia concentration sensor 27 to start or stop the air intake pump 19 and the exhaust air pump 25. When the oxygen concentration in the coffin 01 is higher than a specific value (such as 18%) or the concentration of specific waste gases generated during the decomposition of the body 14 is lower than a specific value, the air intake pump 19 and the exhaust air pump 25 stop transmitting external oxygen-containing air into the coffin 01. However, the exhaust air pump 25 still inhales a small amount of gases in the coffin 01 into the exhaust gas channel 28 where gas concentration sensors are placed in at short intervals to measure the gas concentration in the coffin 01. If the oxygen concentration in the coffin 01 is found to be lower than a specific value (such as 10%) or the concentration of the specific waste gas generated during the decomposition of the body 14 is higher than a specific value, the air intake pump 19 and the exhaust air pump 25 are started to supply oxygen-containing air into the coffin 01. The time required for reducing the oxygen concentration in the coffin 01 from a high concentration (such as 18%) to a low concentration (such as 10%) reflects the rate of consuming oxygen during the decomposition of the body 14. The length of the time can be used to understand the rate of consuming oxygen during the decomposition of the body 14 in the coffin 01, as well as the rate of generating specific waste gases. Thus, it can be determined whether the decomposition of the body 14 in the coffin 01 is normal. On the premise of excluding the slow decomposition rate caused by low temperature, if the rate of consuming oxygen or generating specific waste gases during the decomposition of the body 14 in the coffin 01 gradually becomes very slow after a period of high speed. It can be determined that the decomposition of the body 14 in the coffin 01 has been completed. Since the main components of human bone are inorganic calcium carbonate and calcium phosphate, in a static state, the bones will remain after the decomposition of the body 14.

8. In the disclosure, after the decomposition of the body 14 is completed, the closed hole 8, the exhaust air hole 17, and the air intake hole 18 of the coffin lid 1 can be opened without opening the coffin lid 1, and disinfectants can be added to disinfect the inside of the coffin 01 through these three holes and the exhaust liquid pipe 4. If a final purpose is to obtain ashes, the water can be exhausted after the disinfection, the coffin lid 1 can be opened, and the bones and clothing in the waterproof bag 12 can be cremated into ashes by carrying the waterproof bag 12 in a cremation furnace, or the bones can be directly heated and burned into ashes in the coffin 01 made of stainless steel. If a final purpose is to collect the bones, clean water can be added after disinfection of the bones, and ultrasonic cleaning rods can be inserted into the water in the coffin 01 through the three holes in the middle of the cover lid 1 to perform ultrasonic cleaning on the immersed bones. The water inlet and outlet pipes can be inserted into the coffin 01 through the three holes in the middle of the coffin lid 1, and the small dirts in the coffin 01 can removed by circulating water. The bones and clothing are dried by blowing compressed air through the three holes in the middle of the coffin lid 1. Finally, the coffin lid 1 is opened and the bones are manually collected.

9. As an optional solution, a window made of semi-transparent or transparent material can also be disposed on the coffin lid 1 near the head of the body 14, the window is configured for lighting the inside of the coffin 01 or playing videos to increase a lively atmosphere.

The above embodiments are only used to describe the technical solutions of the disclosure, not to limit the disclosure. Although the disclosure has been described in detail with reference to the embodiments, those ordinary skilled in the art should understand that they can still modify the technical solutions recorded in the embodiments or equivalently replace some of the technical features. These modifications or replacements do not separate the essence of the corresponding technical solutions from the spirit and scope of the embodiments of the disclosure.

What is claimed is:

1. A coffin, configured to decompose a body into bones, and collect the bones or cremate the bones into bone ashes; oxygen required for decomposition of the body is supplied in the coffin through one of the following: an air intake hole disposed on the coffin, a gap on the coffin, an opening covered by a breathable membrane disposed on the coffin, and a water electrolysis reaction in the coffin, and waste gases generated during the decomposition of the body are exhausted through an exhaust air hole disposed on the coffin and an exhaust air pipe connected to the exhaust air hole; and wherein the coffin comprises a coffin lid and a coffin body covered by the coffin lid, the coffin is provided with a film attached on a bottom of the coffin lid and a waterproof bag disposed in the coffin body, and an edge of the film and a top edge of the waterproof bag are pressed and fixed between the coffin lid and the coffin body to define a closed space configured to accommodate the body.

2. The coffin according to claim 1, wherein the coffin is provided with a pump, the pump is configured to exhaust excessive waste liquids generated during the decomposition of the body through an exhaust liquid pipe, and the pump is further configured to transmit water rich in bacterium into the coffin through the exhaust liquid pipe to cause the decomposition of the body when the decomposition of the body is not ongoing.

3. The coffin according to claim 1, wherein the coffin is provided with sensors to detect concentrations of specific gases in the coffin, the specific gases comprise oxygen, carbon dioxide, ammonia, and hydrogen sulfide; an air intake pump which is connected to the air intake hole and an exhaust air pump which is connected to the exhaust air pipe are controlled to be started or stopped according to changes of the concentrations of the specific gases.

4. The coffin according to claim 1, wherein the coffin further comprises: a sealing strip disposed between the film attached on the bottom of the coffin lid and the top edge of the waterproof bag.

5. A method of collecting bones using a coffin, comprising: supplying oxygen required for decomposition of a body in the coffin through one of the following: an air intake hole disposed on the coffin, a gap on the coffin, an opening covered by a breathable membrane disposed on the coffin, and a water electrolysis reaction in the coffin, and exhausting waste gases generated during the decomposition of the body through an exhaust air hole disposed on the coffin and an exhaust air pipe connected to the exhaust air hole;

further comprises: reusing the coffin which is isolated from waste liquids generated during the decomposition of the body by a waterproof bag in a coffin body of the coffin.

6. The method of collecting the bones using the coffin according to claim 5, further comprising: after finishing the decomposition of the body, without opening a lid of the coffin, adding water into the coffin, and inserting a water inlet pipe and an outlet pipe through the holes on the lid of the coffin for cleaning the bones in the coffin.

7. The method of collecting the bones using the coffin according to claim 6, after finishing cleaning the bones in the coffin, further comprising: blowing dry the bones in the coffin with compressed air through the holes on the lid of the coffin without opening the lid of the coffin.

8. The method of collecting the bones using the coffin according to claim 5, further comprising: using one of a specific object and a design to prevent ants or maggots from entering and exiting the coffin through an air intake pipe connected with the air intake hole and the exhaust air pipe, and the specific object and design comprising at least one of the following: one-way valves, screens, porous breathable objects, multi-fiber breathable objects, and breathable membranes.

9. The method of collecting the bones using the coffin according to claim 5, further comprising: using a pump to exhaust excessive waste liquids generated during the decomposition of the body in the coffin through an exhaust liquid pipe connected with the pump.

10. The method of collecting the bones using the coffin according to claim 5, further comprising: wetting an external air which is supplied into the coffin by the following device: a sealed container is partially filled with water, a first pipe and a second pipe are connected with the sealed container, an end of the first pipe is inserted into the water in the sealed container, the other end of the first pipe is out of the sealed container and connected with an air intake pump, an end of the second pipe in the sealed container is above the water in the sealed container, and the other end of the second pipe is connected with an air intake pipe which is connected to the air intake hole on the coffin.

11. The method of collecting the bones using the according to claim 5, further comprising: using sensors to detect concentrations of specific gases in the coffin, wherein the specific gases comprise oxygen, carbon dioxide, ammonia, and hydrogen sulfide; determining a progress of the decomposition of the body by analyzing a rate of concentration changes of the specific gases in the coffin measured by the sensors.

12. A method of using a coffin to decompose a body into bones, comprising: supplying oxygen required for decomposition of the body in the coffin through one of the following: an air intake hole disposed on the coffin, a gap on the coffin, an opening covered by a breathable membrane disposed on the coffin, and a water electrolysis reaction in the coffin, and exhausting waste gases generated during the decomposition of the body through an exhaust air hole disposed on the coffin and an exhaust air pipe connected to the exhaust air hole; and further comprising: using sensors to detect concentrations of specific gases in the coffin, wherein the specific gases comprise oxygen, carbon dioxide, ammonia, and hydrogen sulfide.

13. The method of using the coffin to decompose the body into bones according to claim 12, further comprising: controlling an air intake pump which is connected to the air intake hole and an exhaust air pump which is connected to the exhaust air pipe to be started or stopped according to changes of the concentrations of the specific gases.

14. The method of using the coffin to decompose the body into bones according to claim 12, further comprising: determining a progress of the decomposition of the body by analyzing a rate of concentration changes of the specific gases in the coffin measured by the sensors.

* * * * *